(12) United States Patent
Minegishi et al.

(10) Patent No.: US 11,488,295 B2
(45) Date of Patent: Nov. 1, 2022

(54) EVALUATION DEVICE AND EVALUATION METHOD

(71) Applicant: Konica Minolta, Inc., Tokyo (JP)

(72) Inventors: Natsuko Minegishi, Tokyo (JP); Yoshiki Nakane, Tokyo (JP); Takenobu Kimura, Tokyo (JP); Hiroshi Morimoto, Tokyo (JP); Kei Okamura, Kanagawa (JP); Takashi Akazawa, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 233 days.

(21) Appl. No.: 16/898,848

(22) Filed: Jun. 11, 2020

(65) Prior Publication Data
US 2020/0394783 A1    Dec. 17, 2020

(30) Foreign Application Priority Data

Jun. 11, 2019  (JP) .............................. JP2019-108819

(51) Int. Cl.
*G06T 7/00* (2017.01)
*G03G 15/00* (2006.01)
*G03G 15/08* (2006.01)

(52) U.S. Cl.
CPC ....... *G06T 7/0004* (2013.01); *G03G 15/0848* (2013.01); *G03G 15/5025* (2013.01); *G03G 15/5062* (2013.01)

(58) Field of Classification Search
CPC .............. G06T 7/0004; G03G 15/0848; G03G 15/5025; G03G 15/5062; G01N 21/57
USPC .................................. 382/112, 100; 358/296
See application file for complete search history.

(56) References Cited

U.S. PATENT DOCUMENTS

| | | | |
|---|---|---|---|
| 2005/0047299 A1* | 3/2005 | Kikuchi | G11B 19/12 369/53.2 |
| 2006/0194135 A1* | 8/2006 | Hayashi | G03G 9/08782 430/108.4 |
| 2017/0205291 A1* | 7/2017 | Shimada | H04N 5/2256 |
| 2018/0340087 A1* | 11/2018 | Yuhara | B41J 2/17509 |
| 2018/0373174 A1* | 12/2018 | Kojima | G03G 9/09725 |

FOREIGN PATENT DOCUMENTS

| | | |
|---|---|---|
| JP | 2001-99632 A | 4/2001 |
| JP | 2015-194490 A | 11/2015 |

* cited by examiner

*Primary Examiner* — Sheela C Chawan
(74) *Attorney, Agent, or Firm* — Osha Bergman Watanabe & Burton LLP

(57) ABSTRACT

An evaluation device evaluates an image clarity of a print image. The evaluation device includes: an object that is projected onto a measurement surface of a recording medium; an illuminator that makes the object projected onto the measurement surface; an imager that images the measurement surface on which the object has been projected to obtain image data; and a hardware processor that, based on a distribution of parameters related to a brightness of the image data, quantifies a degree of the image clarity into a numerical value and defines the numerical value as an evaluation value of the image clarity.

18 Claims, 22 Drawing Sheets

|  | IMAGE CLARITY LEVEL DIFFERENCE EXISTS | | | IMAGE CLARITY LEVEL DIFFERENCE DOES NOT EXIST | | |
|---|---|---|---|---|---|---|
|  | VISUAL CONFIRMATION | DETECTION | CORRECTNESS PERCENTAGE | VISUAL CONFIRMATION | DETECTION | CORRECTNESS PERCENTAGE |
| EXAMPLE 1 | 5401 | 4482 | 83 | 4599 | 3617 | 79 |
| EXAMPLE 2 | 5401 | 4158 | 77 | 4599 | 3451 | 75 |

FIG. 27

EVALUATION DEVICE AND EVALUATION METHOD

CROSS REFERENCE TO RELATED APPLICATIONS

The entire disclosure of Japanese patent Application No. 2019-108819, filed on Jun. 11, 2019, is incorporated herein by reference in its entirety.

BACKGROUND

Technical Field

The present invention relates to an evaluation device and an evaluation method.

Description of Related Art

Hitherto, in order to detect the glossy feel of a print image formed on a recording medium by an image forming apparatus, a device that measures the glossiness or the image clarity of a print image has been known. The glossiness is a physical quantity that indicates the specular reflectance of an object with respect to incident light that is incident thereupon at a predetermined angle. The image clarity is referring to texture corresponding to the sharpness of a reflected image that is projected onto an object, and is indicated by the visual impression of a user.

For example, Japanese Patent Application Laid-Open No. 2001-99632 discloses a structure in which a standard pattern, which is an object, is projected onto a rough object to obtain image data related to a reflected image of the standard pattern, and, based on a parameter related to the image data, the magnitude of a fluctuation of the reflected image is calculated. In this structure, the surface property of the rough object is calculated based on the calculated value.

Japanese Patent Application Laid-Open No. 2015-194490 discloses a structure in which a specularly reflected image of an image confirmed as not being abnormal is a standard image, and, in the specularly reflected image of a print image to be evaluated, a portion that differs from the standard image is detected as a defect. In this structure, a physical quantity of the same nature as glossiness is detected.

However, even if the glossinesses at the surfaces of a plurality of print images are the same, the visual impression of a user may differ for each print image. Therefore, it is desired that the glossy texture of the print images be evaluated by detecting the image clarity instead of the glossiness of the print images.

The structure described in Japanese Patent Application Laid-Open No. 2001-99632 has a property in that since the magnitude of the fluctuation of the reflected image is calculated based on the reflected image of the standard pattern, the sensitivity with respect to the image clarity of a recording medium used for printing is poor.

Japanese Patent Application Laid-Open No. 2015-194490 has a property in that since the step of confirming an image serving as a standard image is required, the evaluation step of evaluating the glossy texture of the print images cannot be automated, and the evaluation step becomes complicated.

SUMMARY

One or more embodiments of the present invention provide an evaluation device and an evaluation method that are capable of automatically detecting the image clarity of print images and accurately evaluating the image clarity of the print images.

One or more embodiments of the present invention provide an evaluation device that evaluates an image clarity of a print image, the evaluation device comprising:
 an object that is projected onto a print image surface which is a measurement surface of a recording medium;
 an illuminator that allows the object to be projected onto the measurement surface;
 an imager that images the measurement surface on which the object has been projected; and
 a hardware processor that, based on a distribution of parameters related to a brightness of image data imaged by the imager, quantifies a degree of the image clarity into a numerical value and defines the numerical value as an evaluation value of the image clarity.

One or more embodiments of the present invention provide an evaluation method that evaluates an image clarity of a print image in an evaluation device including an object that is projected onto a print image surface which is a measurement surface of a recording medium, and an illuminator that allows the object to be projected onto the measurement surface, the evaluation method comprising:
 imaging the measurement surface on which the object has been projected; and
 based on a distribution of parameters related to a brightness of image data imaged by the imager, quantifying a degree of the image clarity into a numerical value and defining the numerical value as an evaluation value of the image clarity.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 27 shows experimental results related to correctness percentages of results obtained by determining whether or not image clarity level differences exist according to one or more embodiments.

DETAILED DESCRIPTION OF EMBODIMENTS

Hereinafter, embodiments of the present invention will be described with reference to the drawings. However, the scope of the invention is not limited to the disclosed embodiments.

Figure 1:
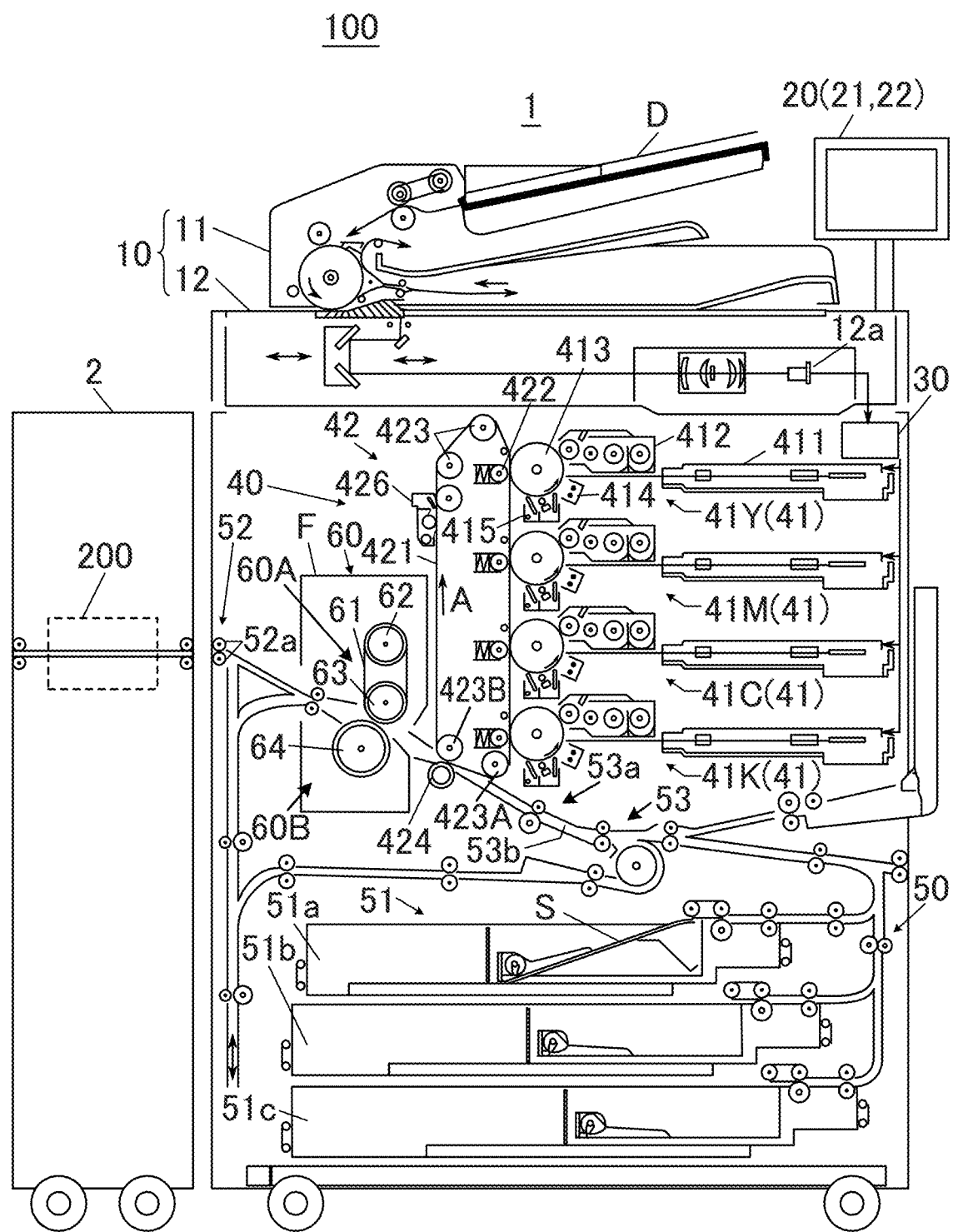
FIG. 1 schematically shows an entire structure of an image forming system including an evaluation device according to one or more embodiments of the present invention.
Figure 2:
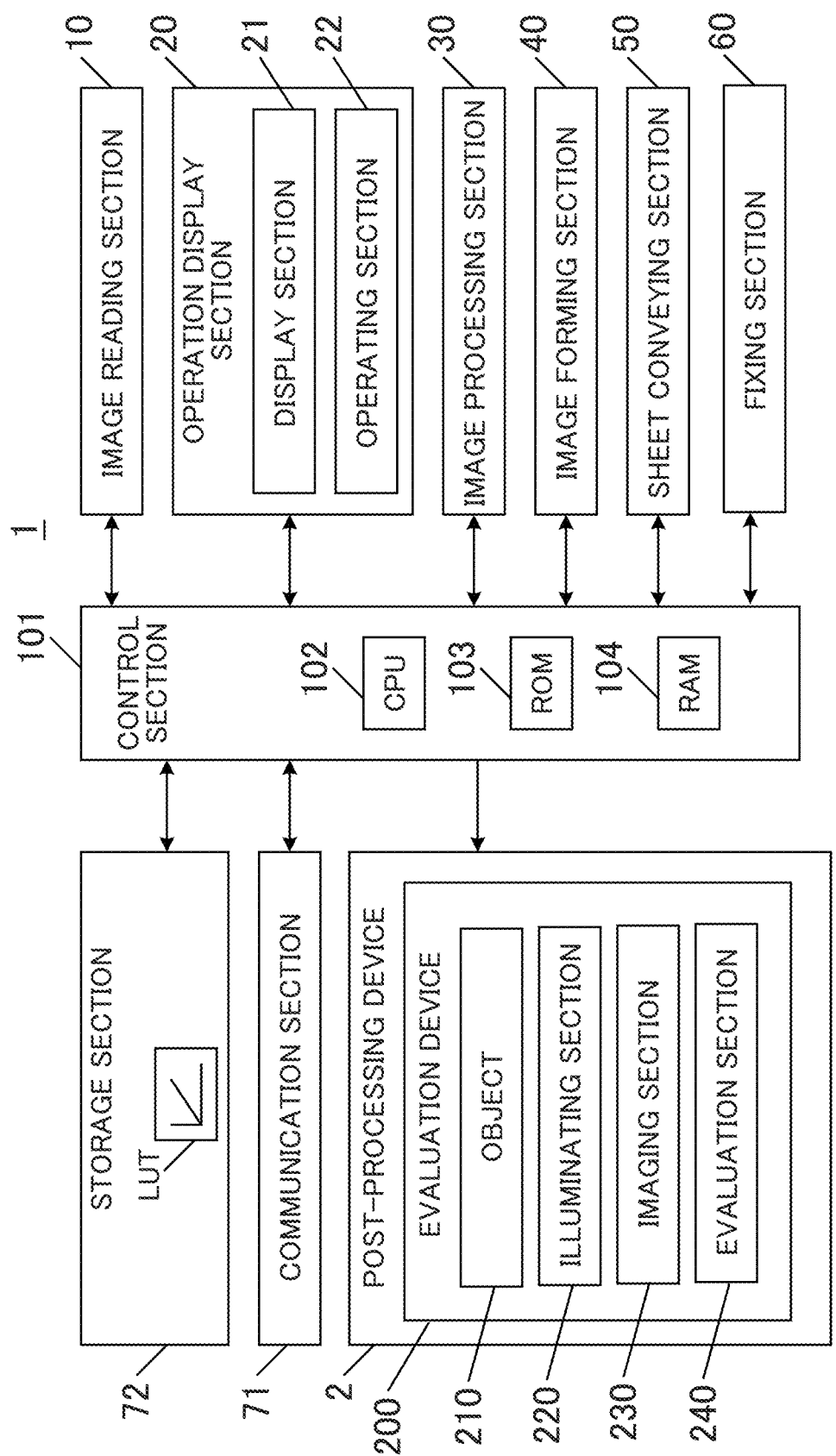
FIG. 2 shows a main portion of a control system of an image forming apparatus according to one or more embodiments.

One or more embodiments of the present invention are described in detail below based on the drawings. FIG. 1 schematically shows an entire structure of image forming system 100 including evaluation device 200 according to one or more embodiments of the present invention. FIG. 2 shows a main portion of a control system of image forming apparatus 1.

As shown in FIG. 1, image forming system 100 includes image forming apparatus 1 and post-processing apparatus 2 that are connected to each other from an upstream side in a conveying direction of sheet S, serving as an example of a recording medium.

Image forming apparatus 1 is an intermediate-transfer-type color image forming apparatus that uses an electrophotographic process technology. That is, image forming apparatus 1 primary-transfers toner images for respective colors, Y (yellow), M (magenta), C (cyan), and K (black) that are formed on photoconductor drums 413 onto intermediate transfer belt 421, and, after the toner images for the four colors have been superimposed on intermediate transfer belt 421, secondary-transfers the toner images onto sheet S sent from sheet feed tray units 51a to 51c to form images.

Image forming apparatus 1 uses a tandem system in which photoconductor drums 413 provided in correspondence with the four colors, Y, M, C, and K, are arranged in series in a movement direction of intermediate transfer belt 421 and the color toner images are successively transferred onto intermediate transfer belt 421 by one procedure.

As shown in FIG. 2, image forming apparatus 1 includes image reading section 10, operation display section 20, image processing section 30, image forming section 40, sheet conveying section 50, fixing section 60, and control section 101.

Control section 101 includes, for example, CPU (central processing unit) 102, ROM (read only memory) 103, and RAM (random access memory) 104. CPU 102 reads a program that is in accordance with processing content from ROM 103 and transmits it to RAM 104, and, in cooperation with the transmitted program, centrally controls the operation of, for example, each block of image forming apparatus 1. At this time, control system 101 refers to various pieces of data stored in storage section 72. Storage section 72 is constituted by, for example, a nonvolatile semiconductor memory (a so-called flash memory) or a hard disk drive.

Control section 101 transmits and receives, via communication section 71, various types of data to and from external devices (such as personal computers) connected to a communication network, such as LAN (local area network) or WAN (wide area network). For example, control section 101 receives image data (input image data) transmitted from an external device to form an image on sheet S based on the image data. Communication section 71 is constituted by, for example, a communication control card, such as a LAN card.

As shown in FIG. 1, image reading section 10 includes, for example, automatic document feeding device (so-called ADF (auto document feeder) 11 and document image scanning device 12 (scanner).

Automatic document feeding device 11 conveys document D placed on a document tray by a conveying mechanism, and sends document D to document image scanning device 12. Automatic document feeding device 11 makes it possible to continuously read all together images (including both sides) of a plurality of documents D placed on the document tray.

Document image scanning device 12 optically scans a document conveyed onto contact glass from automatic document feeding device 11 or a document on the contact glass, focuses reflected light from the document on a light-receiving surface of CCD (charged coupled device) sensor 12a, and reads a document image. Image reading section 10 generates input image data based on a reading result provided by document image scanning device 12. The input image data is subjected to a predetermined image processing operation at image processing section 30.

As shown in FIG. 2, operation display section 20 is constituted by, for example, a liquid crystal display (LCD) with a touch panel, and functions as display section 21 and operating section 22. Display section 21 provides, for example, various operation screen displays, image states, and operation states of respective functions in accordance with a display control signal that is input from control section 101. Operating section 22 includes various operation keys, such as a numeric key pad and a start key, and is subjected to various input operations by a user to output an operation signal to control section 101.

Image processing section 30 includes, for example, a circuit for performing a digital image processing operation in accordance with an initial setting or a setting by a user. For example, under the control of control section 101, gradation is corrected based on gradation correction data (gradation correction table). Image processing section 30 performs, in addition to the correction of gradation, various other correction operations, such as the correction of color and the correction of shading, and a compression operation. Image forming section 40 is controlled based on image data subjected to these operations.

As shown in FIG. 1, image forming section 40 forms an image on sheet S based on a printing job setting. Image forming section 40 includes, for example, image forming units 41Y, 41M, 41C, 41K for forming images by using color toners for a Y component, an M component, a C component, and a K component based on the input image data, and intermediate transfer unit 42.

Image forming units 41Y, 41M, 41C, and 41K for the Y component, the M component, the C component, and the K component, respectively, have the same structure. For the convenience of the drawings and the description, common structural elements are given the same reference signs, and when structural elements need to be distinguished, Y, M, C, or K is added to the reference sign. In FIG. 1, reference signs are given only to the structural elements of image forming unit 41Y for the Y component, and reference signs are not given to the structural elements of the other image forming units 41M, 41C, and 41K.

Each image forming unit 41 includes, for example, exposing device 411, developing device 412, photoconductor drum 413, charging device 414, and drum cleaning device 415.

Each photoconductor drum 413 is, for example, an organic photoconductor in which a photosensitive layer made of a resin containing an organic photoconductive material is formed on an outer peripheral surface of a drum-shaped metal base body.

Control section 101 controls drive current that is supplied to a drive motor (not shown) that rotates each photoconductor drum 413, to rotate each photoconductor drum 413 at a certain peripheral speed.

Each charging device 414 is, for example, a charging charger, and causes corona discharging to occur to uniformly negatively charge the surface of its corresponding photoconductor drum 413 having photoconductivity.

Each exposing device 411 is constituted by, for example, a semiconductor laser, and illuminates its corresponding photoconductor drum 413 with a laser light ray for an image of the corresponding color component. As a result, electrostatic latent images for the respective color components are formed on image regions of the surfaces of the respective photoconductor drums 413 due to electrical potential differences, the image regions being irradiated with the laser light rays.

Each developing device 412 is a two-component reversal type developing device, and causes developer for its corresponding color component to adhere to the surface of the corresponding photoconductor drum 413 to make visible the electrostatic latent image and form a toner image.

Each developing device 412 is subjected to a direct-current developing bias having the same polarity as the charging polarity of its corresponding charging device 414 or a developing bias in which a direct-current voltage having the same polarity as the charging polarity of its corresponding charging device 414 is superimposed upon an alternating-current voltage. As a result, reversal development in which toners are caused to adhere to the electrostatic latent images formed by exposing devices 411 is performed.

Each drum cleaning device 415 includes, for example, a planar drum cleaning blade that is brought into contact with the surface of its corresponding photoconductor drum 413 and that is made of an elastic material, and removes remaining toner remaining on the surface of its corresponding photoconductor drum 413 without being transferred onto intermediate transfer belt 421.

Intermediate transfer unit 42 includes, for example, intermediate transfer belt 421, primary transfer rollers 422, a plurality of support rollers 423, secondary transfer roller 424, and belt cleaning device 426.

Intermediate transfer belt 421 is constituted by an endless belt, and is tightly stretched around the plurality of support rollers 423 in the form of a loop. At least one of the plurality of support rollers 423 is constituted by a driving roller and other support rollers 423 are constituted by driven rollers. For example, a roller 423A that is disposed on a downstream side in the belt movement direction with respect to primary transfer roller 422 for the K component may be a driving roller. This makes it easier to maintain the belt movement speed at a first transfer section. By rotating driving roller 423A, intermediate transfer belt 421 moves at a certain speed in the direction of arrow A.

Intermediate transfer belt 421 is an elastic belt having conductivity, and includes a high-resistance layer on a surface thereof. Intermediate transfer belt 421 is rotationally driven due to a control signal from control section 101.

Each primary transfer roller 422 is disposed on an inner peripheral surface side of intermediate transfer belt 421 so as to face photoconductor drum 413 for its corresponding color component. By press-contacting primary transfer rollers 422 against photoconductor drums 413 with intermediate transfer belt 421 interposed therebetween, primary transfer nips for transferring the toner images to intermediate transfer belt 421 from photoconductor drums 413 are formed.

Secondary transfer roller 424 is disposed on an outer peripheral surface side of intermediate transfer belt 421 so as so face backup roller 423B that is disposed on a downstream side in the belt movement direction with respect to driving roller 423A. By press-contacting secondary transfer roller 424 against backup roller 423B with intermediate transfer belt 421 interposed therebetween, a secondary transfer nip for transferring the toner images to sheet S from intermediate transfer belt 421 is formed.

When intermediate transfer belt 421 passes the primary transfer nips, the toner images on photoconductor drums 413 are successively superimposed on and primary-transferred to intermediate transfer belt 421. Specifically, a primary transfer bias is applied to first transfer rollers 422, and a charge having a polarity opposite to the polarity of the toners is applied to a back side of intermediate transfer belt 421, that is, to a side in contact with first primary rollers 422, to electrostatically transfer the toner images to intermediate transfer belt 421.

Thereafter, when sheet S passes the secondary transfer nip, the toner images on the intermediate transfer belt 421 are secondary-transferred to sheet S. Specifically, a secondary transfer bias is applied to secondary transfer roller 424, and a charge having a polarity opposite to the polarity of the toners is applied to a back-surface side of sheet S, that is, to a side in contact with secondary transfer roller 424, to electrostatically transfer the toner images to sheet S. Sheet S to which the toner images have been transferred is conveyed toward fixing section 60.

Belt cleaning device 426 removes transfer remaining toner that remains on a surface of intermediate transfer belt 421 after the secondary transfer.

Fixing section 60 includes, for example, upper fixing section 60A, lower fixing section 60B, and a heating source. Upper fixing section 60A includes fixing-surface-side members that are disposed at a fixing surface of sheet S, that is, on a side of a surface of sheet S where the toner images are formed. Lower fixing section 60B includes a back-surface-side support member that is disposed at a back surface of sheet S, that is, on a side of a surface of sheet S opposite to the fixing surface. By press-contacting the back-surface-side support member against the fixing-surface-side member, a fixing nip that nips and conveys sheet S is formed.

Fixing section 60 heats and presses sheet S, to which the toner images have been second-transferred and that has been conveyed, at the fixing nip, to fix the toner images to sheet S. Fixing section 60 is disposed as a unit inside a fixing device F.

Upper fixing section 60A includes endless fixing belt 61, heating roller 62, and fixing roller 63, which are the fixing-surface-side members. Fixing belt 61 is tightly stretched by heating roller 62 and fixing roller 63.

Lower fixing section 60B includes pressing roller 64, which is the back-surface-side support member. Pressing roller 64 forms the fixing nip where sheet S is nipped and conveyed by pressing roller 64 and fixing belt 61.

Sheet conveying section 50 includes, for example, sheet feeding section 51, sheet ejecting section 52, and conveying path section 53. Sheets S (standard sheets, special sheets) that are distinguished based on, for example, the basis weight or size are accommodated according to preset types in three sheet feed tray units 51a to 51c that constitute sheet feeding section 51.

Conveying path section 53 includes, for example, a plurality of conveyance roller pairs, such as registration roller pair 53a, and ordinary conveying path 53b that allows sheet S to pass image forming section 40 and fixing section 60 and to be ejected to the outside of image forming apparatus 1.

Sheets S that are accommodated in sheet feed tray units 51a to 51c are sent one by one from an uppermost portion, and are conveyed to image forming section 40 via conveying path section 53. In image forming section 40, the toner images on intermediate transfer belt 421 are secondary-transferred all together on one surface of each sheet S, and are subjected to a fixing step at fixing section 60. Sheets S on which images have been formed are ejected to the outside of image forming apparatus 1 by sheet ejecting section 52 including sheet ejecting rollers 52a.

Post-processing device 2 includes evaluation device 200 that receives sheet S ejected from image forming apparatus 1 and that evaluates print image formed on sheet S. Evaluation device 200 includes object 210, illuminating section 220, imaging section 230, and evaluation section 240.

Figure 3:
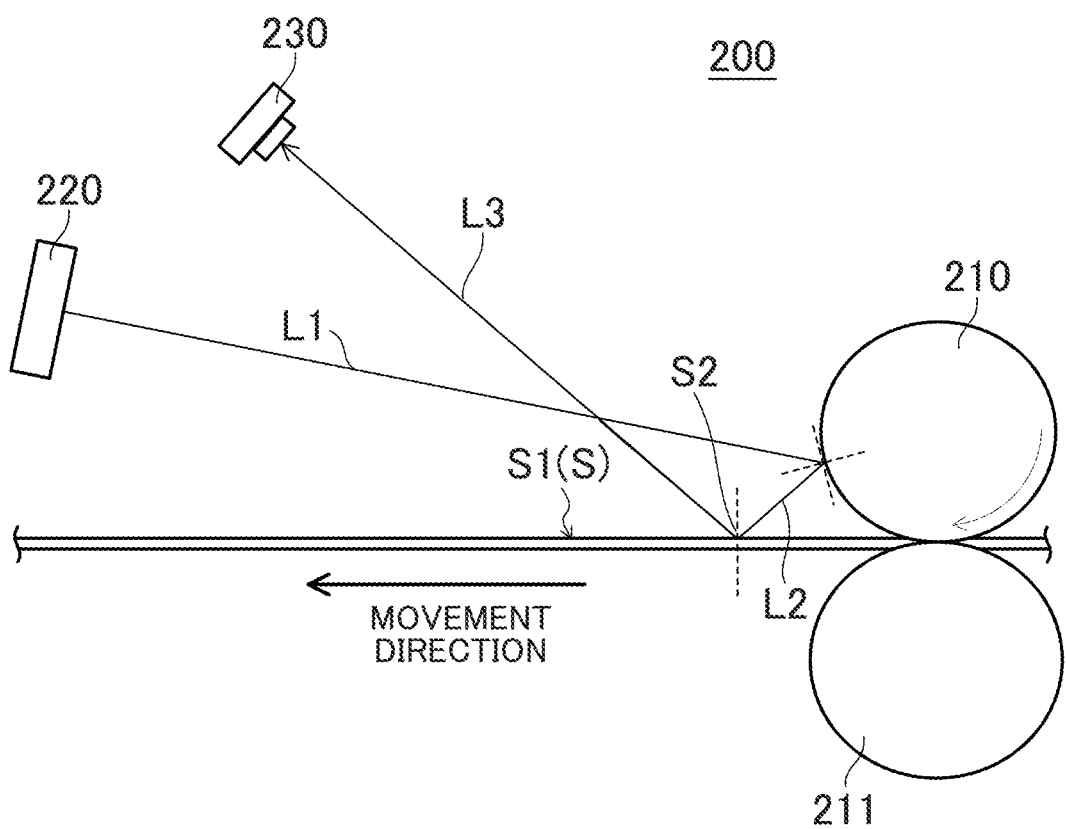
FIG. 3 shows the details of the evaluation device according to one or more embodiments.
Figure 4:
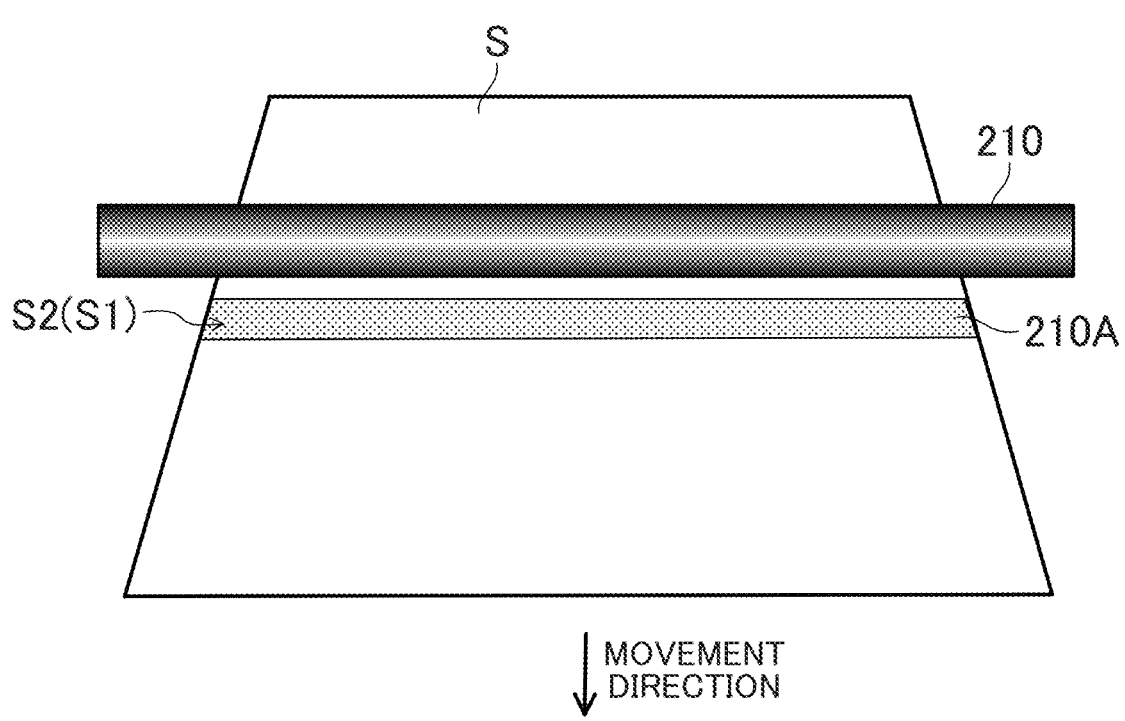
FIG. 4 shows a state in which a reflected image of an object is projected on a sheet according to one or more embodiments.

As shown in FIG. 3, object 210 is a metal member for being projected onto a print image surface, which is measurement surface S1 of sheet S. Object 210 is a roller member that extends (i.e., has a length extending) in a first direction and that is rotatable. The first direction is a direction orthogonal to the movement direction of sheet S and is parallel to a surface of sheet S (see FIG. 4).

Facing roller 211 is provided at a position facing object 210 in an up-down direction. Object 210 and facing roller 211 constitute a conveyance roller pair that conveys sheet S. Sheet S passes a nip position between object 210 and facing roller 211. That is, object 210 is rotatable in a direction along the movement direction of sheet S that is conveyed, and is capable of contacting sheet S. The surface of object 210 is mirror-finished and is capable of reflecting light.

Illuminating section 220 is an illuminating device that performs surface-emission from the entire surface extending (i.e., has a length extending) in the first direction, and emits light for projecting object 210 onto measurement surface S1 of sheet S. Illuminating section 220 is disposed at a position above object 210 so as to face object 210, and emits light to at least a portion of object 210 in correspondence with sheet S.

When light L1 emitted from illuminating section 220 is incident upon object 210, light L1 is reflected toward sheet S at a reflection angle that is equal to an incident angle with respect to object 210. That is, light L1 emitted from illuminating section 220 is reflected toward measurement surface S1 of sheet S. This causes reflected image 210A of object 210 to be projected onto measurement surface S1 of sheet S (see FIG. 4).

Imaging section 230 is a section that obtains an image of measurement surface S1 on which object 210 has been projected, and is, for example, an imaging member, such as a camera. Light L2 reflected from object 210 and incident upon measurement surface S1 is reflected from measurement surface S1 at a reflection angle that is equal to its incident angle. Imaging section 230 is disposed at optical path of light L3 reflected from measurement surface S1.

Therefore, imaging section 230 performs imaging on the vicinity of incidence portion S2 of light L2 on measurement surface S1. Image data imaged by imaging section 230 becomes, for example, image data such as those shown in FIG. 5 and FIG. 6. Such pieces of image data are pieces of image data when a print image formed on sheet S is a solid image whose coverage rate in the first direction is 100%.

Figure 5:
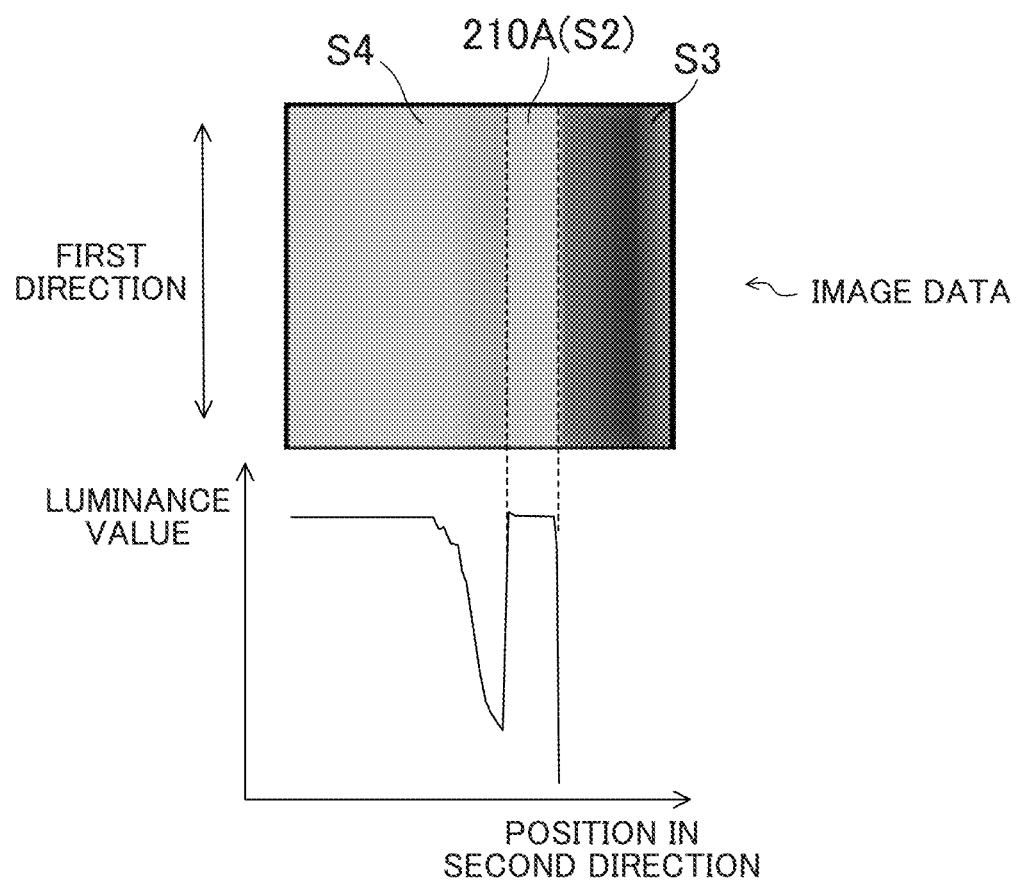
FIG. 5 shows image data and the distribution of luminance values when the image clarity is high according to one or more embodiments.
Figure 6:
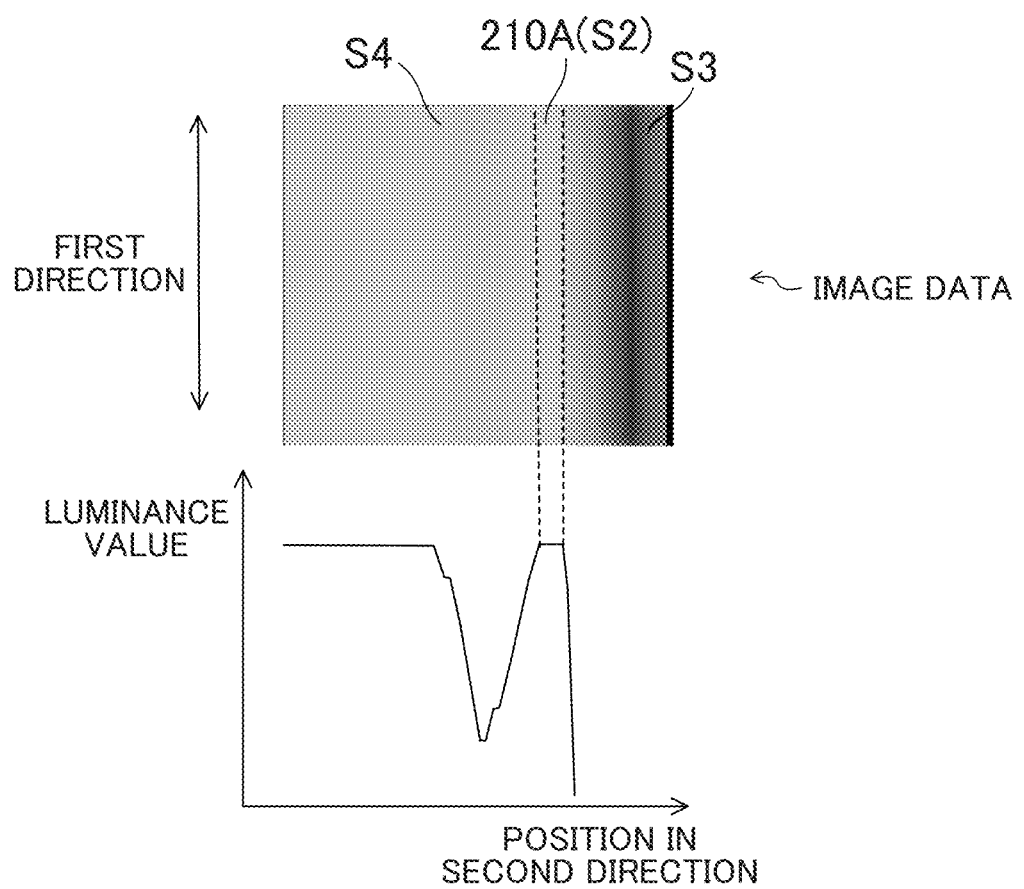
FIG. 6 shows image data and the distribution of luminance values when the image clarity is low according to one or more embodiments.

In the pieces of image data shown in FIG. 5 and FIG. 6, reflected image 210A exists so that its luminance value is higher than those of first portion S3 and second portion S4 disposed around reflected image 210A. First portion S3 is a portion that is closer than reflected image 210A to object 210. Second portion S4 is a portion that is farther than reflected image 210A to object 210. Since first portion S3 is in the shadow of object 210 due to the influence of light L2 incident upon incident portion S2, the luminance value of first portion S3 is lower than the luminance value of second portion S4.

A second direction is a direction opposite to the movement direction, and is a direction that is toward object 210 from illuminating section 220, that is orthogonal to the first direction, and that is parallel to measurement surface S1.

A boundary between incident portion S2 and first portion S3 and a boundary between incident portion S2 and second portion S4 differ from each other due to the degrees of image clarity of sheet S. For example, as shown in FIG. 5, when sheet S is a recording medium (such as cast-coated paper or gloss-coated paper) having a high image clarity, the luminance value changes sharply at a portion of each boundary to an extent that allows each boundary to be clearly seen. In contrast, as shown in FIG. 6, when sheet S is a recording medium (such as high-quality paper) having a low image clarity, each boundary is blurred and the luminance value varies gently at the portions of the boundaries.

Evaluation section 240 includes a CPU (central processing unit), ROM (read only memory), RAM (random access memory), and an input/output circuit. Evaluation section 240 is configured to evaluate the degree of image clarity of a print image based on image data imaged by imaging section 230 based on a preset program.

Specifically, when evaluation device 200 evaluates a print image, evaluation section 240 communicates with control section 101 of image forming apparatus 1. Control section 101 controls image forming section 40 so that a predetermined print image is formed on sheet S. The predetermined print image is a solid image whose coverage rate in the first direction is 100%.

When sheet S on which the print image has been formed is conveyed to evaluation device 200, at a timing in which sheet S is passing the position of object 210, evaluation section 240 causes illuminating section 220 to emit light and object 210 to be projected onto measurement surface S1 of sheet S. Evaluation section 240 causes imaging section 230 to perform imaging on measurement surface S1 of sheet S to obtain imaged image data.

Figure 7:
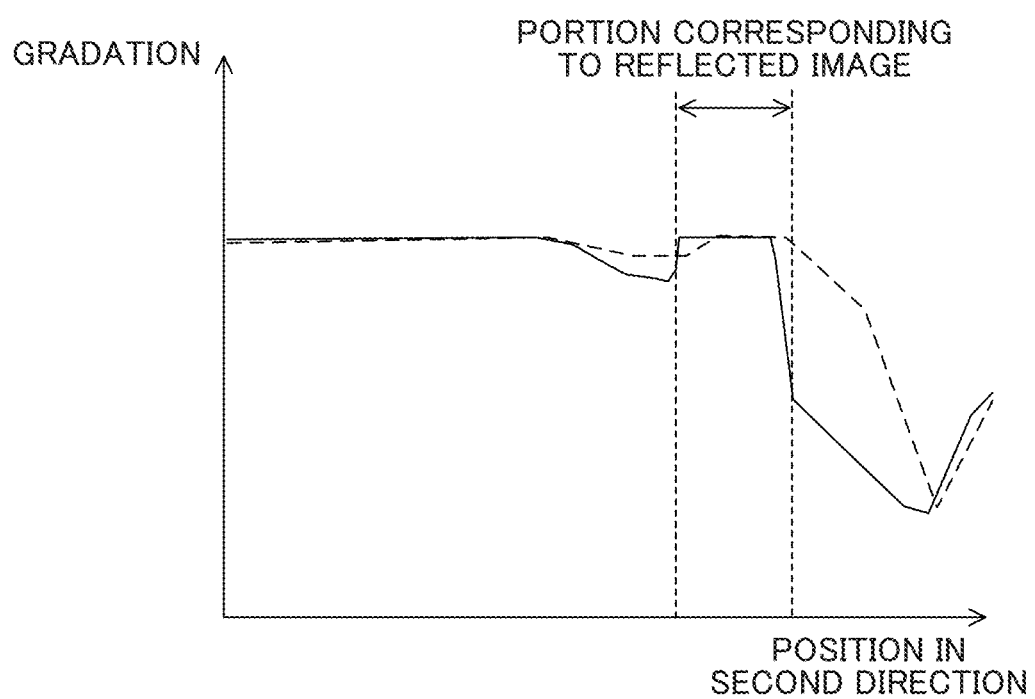
FIG. 7 shows an example of a gradation distribution extracted from image data according to one or more embodiments.

As shown in FIG. 7, when evaluation section 240 has obtained the image data, evaluation section 240 extracts a gradation value distribution in the second direction above for each of a plurality of positions in the first direction. The solid line in FIG. 7 indicates a distribution for a recording medium on which a print image having a high image clarity is formed. The broken line in FIG. 7 indicates a gradation value distribution for a recording medium on which a print image having a low image clarity is formed. The gradation value corresponds to "parameter related to the brightness of image data" of one or more embodiments of the present invention.

Evaluation section 240 differentiates the gradation value distribution in the second direction. The gradation value distribution has a relatively easy-to-understand characteristic in that, at boundaries of a portion corresponding to reflected image 210A on a side opposite to object 210, after the gradation value decreases, the gradation value increases. The differential value of the distribution near the boundary is a negative value at a portion where the gradation value is decreasing, and is a positive value at a portion where the gradation value is increasing. The differential value of the distribution is 0 at a portion where the gradation value is constant.

In order to make it possible to determine variations in the differential values near the boundaries above, evaluation section 240 selects an evaluation range in which the differential value is a positive value and in which a position where the gradation value becomes a maximum value within the range is included. That is, the evaluation range includes a range corresponding to reflected image 210A of object 210.

The evaluation range may also be determined based on a previously measured position in the image data. This is because it is easier to infer in what range in the image data reflected image 210A is positioned.

Figure 8A:
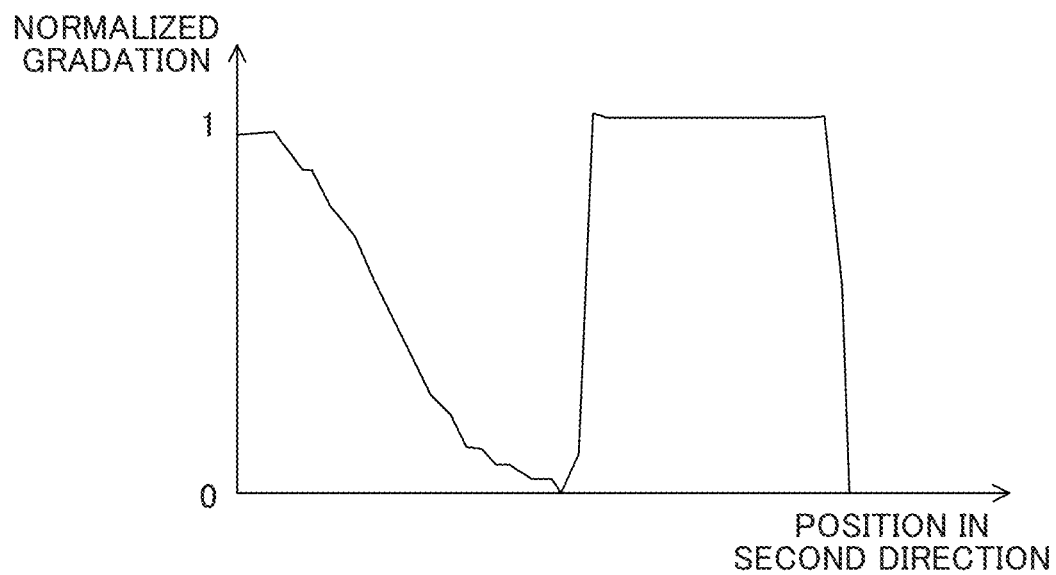
FIG. 8A shows a gradation distribution when the gradation of a solid-line portion in FIG. 7 is normalized.
Figure 8B:
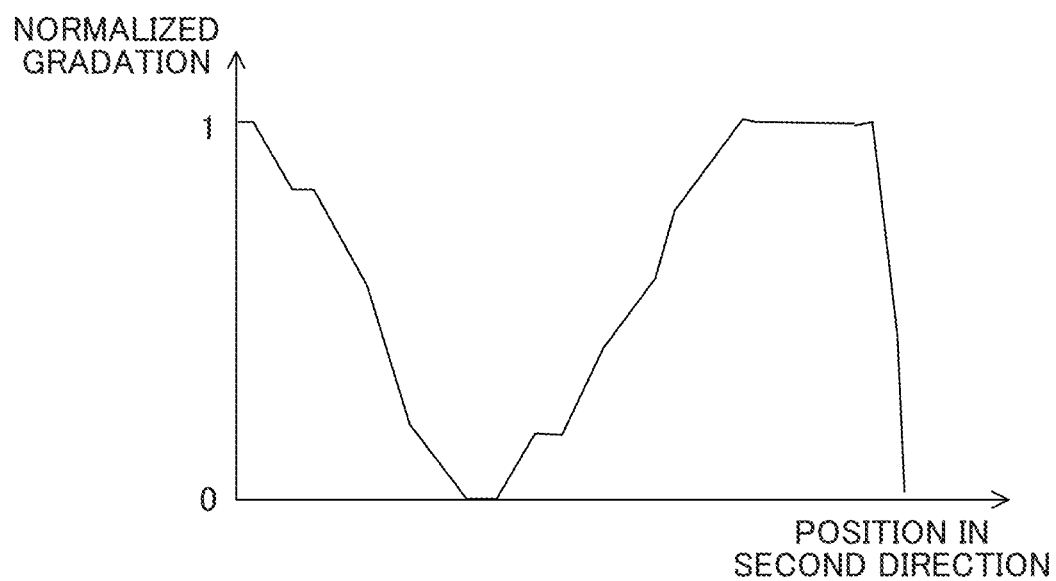
FIG. 8B shows a gradation distribution when the gradation of a broken-line portion in FIG. 7 is normalized.

As shown in FIG. 8A and FIG. 8B, evaluation section 240 normalizes the gradations so that, in the evaluation range, the position where the gradation value becomes a minimum value becomes 0 and the position where the gradation value becomes a maximum value becomes 1. FIG. 8A shows a gradation distribution when the gradation of a solid-line portion in FIG. 7 is normalized. FIG. 8B shows a gradation distribution when the gradation of a broken-line portion in FIG. 7 is normalized.

Evaluation section 240 uses, in evaluating the image clarity, a range extending from a position where the differential value of the gradation in the distribution at first becomes a positive value to a position where the differential value becomes a maximum value, toward object 210 from illuminating section 220.

The position where the differential value becomes a maximum value may be a position where the gradation becomes a maximum value, or may be a position where the differential value of the gradation value in the distribution has changed from a positive value to a value less than or equal to 0.

Figure 9A:
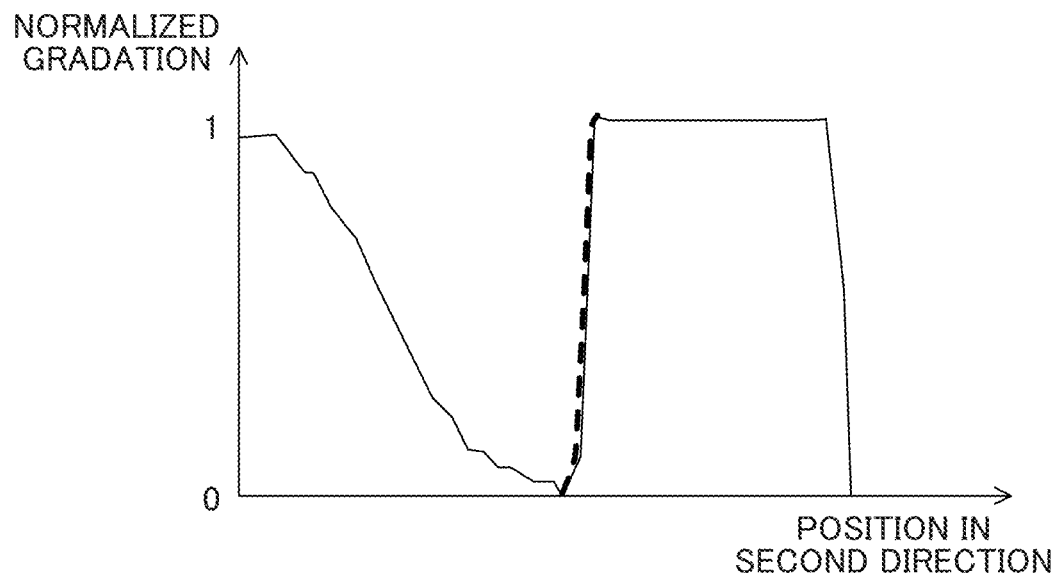
FIG. 9A shows an example of a normal distribution curve fitted to the gradation distribution shown in FIG. 8A.
Figure 9B:
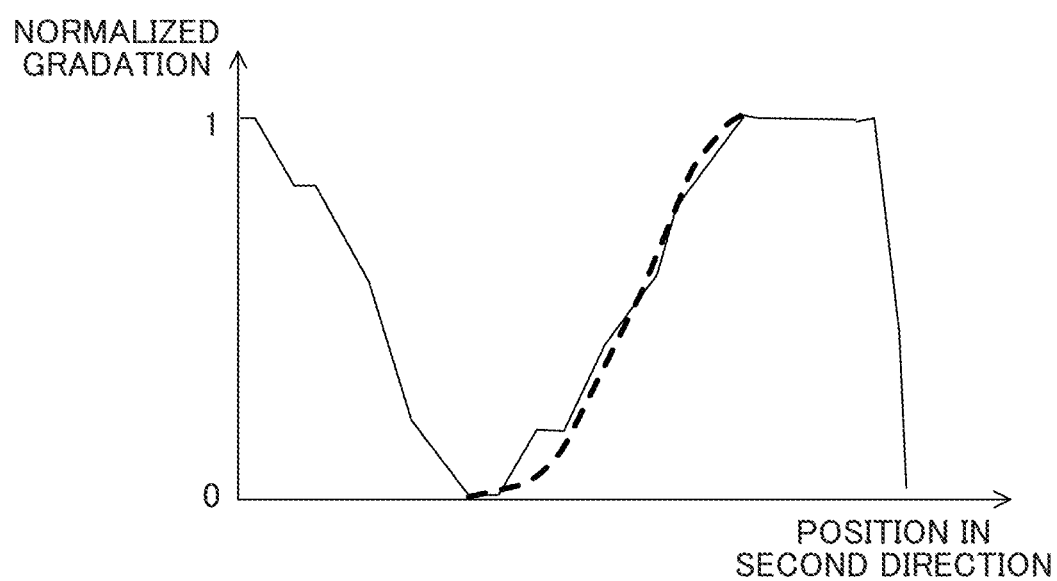
FIG. 9B shows an example of a normal distribution curve fitted to the gradation distribution shown in FIG. 8B.

As shown in FIGS. 9A and 9B, evaluation section 240 extracts, in the range used in evaluating the image clarity, a normal distribution curve in which the position where the gradation value becomes a minimum value is a lower limit value and the position where the gradation value becomes a maximum value is an upper limit value. Evaluation section 240 fits the normal distribution curve to the normalized gradation distribution.

FIG. 9A corresponds to FIG. 8A, and FIG. 9B corresponds to FIG. 8B. The broken lines in FIG. 9A and FIG. 9B are extracted normal distribution curves. Regarding each normal distribution curve, only one side from the lower limit value to the upper limit value is shown.

Evaluation section 240 calculates standard deviation σ by comparing the normal distribution curves and the gradation distributions. The evaluation section 240 causes calculated standard deviation σ to be an evaluation value that becomes an evaluation index for image clarity.

Evaluation section 240 calculates standard deviation σ for each position in the first direction, and extracts a distribution of standard deviations σ in the first direction. Based on variation amounts of the distribution of standard deviations σ, evaluation section 240 determines whether or not the image clarity of a print image is non-uniform.

When the difference between a first average value of a plurality of standard deviations σ and a second average value of the plurality of standard deviations σ is greater than or equal to a predetermined value, evaluation section 240 determines that the print image is non-uniform.

The first average value is an average value of the plurality of standard deviations σ that is larger than an overall average value of the standard deviations σ. The first average value is, for example, an average value of the plurality of standard deviations σ that is included in the top 20% of all of the standard deviations σ.

The second average value is an average value of a plurality of standard deviations σ that are smaller than the overall average value of the standard deviations σ. The second average value is, for example, an average value of the plurality of standard deviations σ that is included in the bottom 20% of all of the standard deviations σ.

The predetermined value is a value that is set as appropriate to a value that allows a level difference in the image clarity to be known, and is, for example, a value equal to a value in which the first average value is twice the second average value.

Figure 10A:
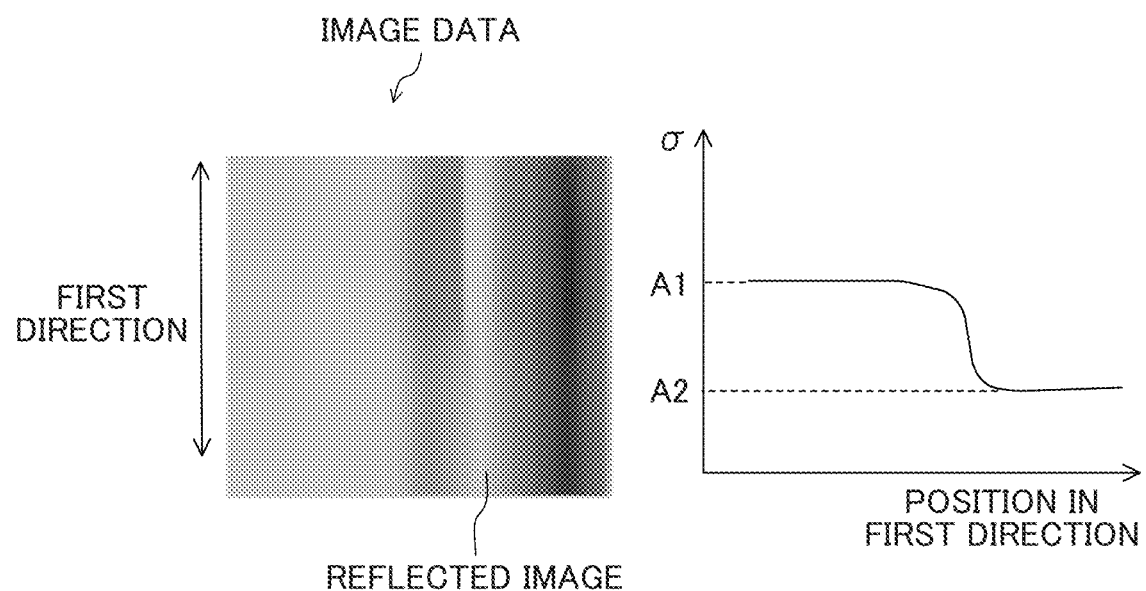
FIG. 10A shows image data and a standard deviation distribution corresponding to the image data when an image clarity level difference exists according to one or more embodiments.

For example, as shown in FIG. 10A, it is assumed that image data in which portions where the boundaries of the reflected image 210A are relatively clear in the first direction and portions where the boundaries of reflected image 210A are unclear in the first direction are mixed is obtained. In this case, a standard-deviation-σ distribution in which, in the first direction, the standard deviation σ, after being a value close to A1, varies towards the right to a value close to A2 that is smaller than A1 by at least the predetermined value and continues to be a value close to A2 is obtained.

In such a case, although the first average value is a value close to A1 and the second average value is a value close to A2, since the difference between the first average value and the second average value is large, evaluation section 240 determines that the image clarity of the print image is non-uniform.

When the difference between the first average value and the second average value is less than the predetermined value, evaluation section 240 determines that the print image is not non-uniform.

Figure 10B:
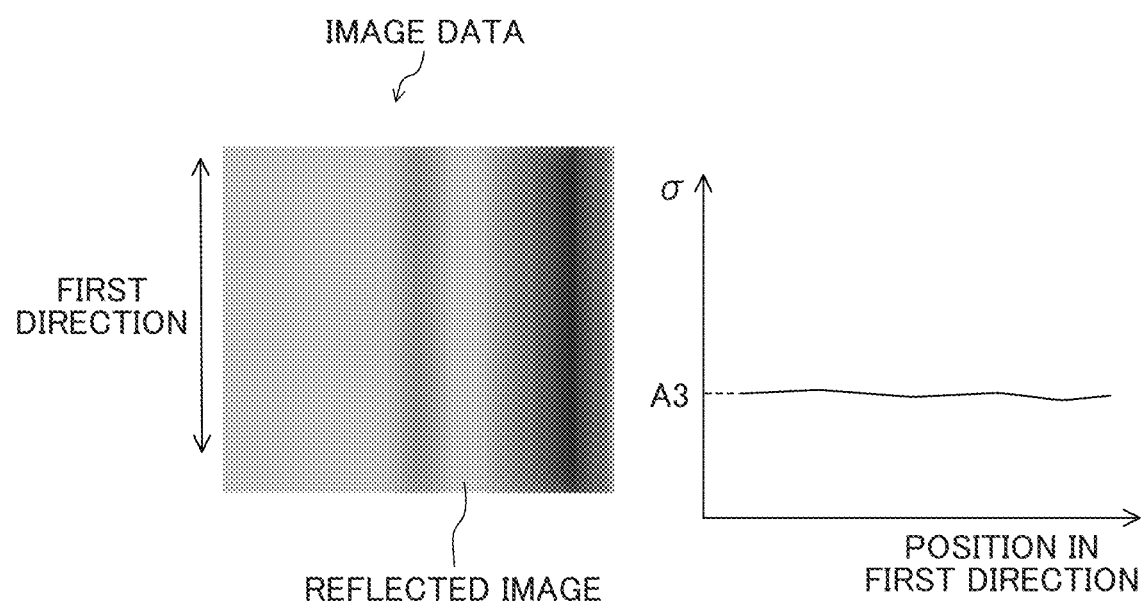
FIG. 10B shows image data and a standard deviation distribution corresponding to the image data when an image clarity level difference does not exist according to one or more embodiments.

For example, as shown in FIG. 10B, it is assumed that image data in which the boundaries of the reflected image 210A are relatively clear in the first direction is obtained. In this case, a standard-deviation-σ distribution in which, in the first direction, the standard deviation σ continues to be a value close to A3 towards the right is obtained.

In such a case, since there is almost no difference between the first average value and the second average value, evaluation section 240 determines that the image clarity of the print image is not non-uniform.

Accordingly, in one or more embodiments, since evaluation section 240 quantifies the degree of the image clarity of the print image by imaging the print image, evaluation section 240 can automatically detect the image clarity of the print image. As a result, compared to a structure in which a standard image, which is a standard for evaluating the image clarity, and a print image are compared, it is possible to simplify the evaluation step of evaluating the image clarity of the print image.

Since the image clarity of a print image is determined based on the standard-deviation-σ distribution in the first direction calculated by quantifying the degree of the image clarity, it is possible to accurately evaluate the image clarity of the print image.

Evaluation section 240 outputs the results of determination of the image clarity of the print image to, for example, control section 101 of image forming apparatus 1. When control section 101 has obtained the results of determination of the image clarity of the print image, control section 101 displays the results of determination on, for example, display section 21.

When this is done, a user can easily determine whether or not sheet S of a predetermined type is suited as a recording medium on which printing is to be performed by image forming apparatus 1.

Evaluation section 240 may, based on the results of determination of the image clarity of the print image, determine whether or not to, in image forming apparatus 1 that has formed the print image on sheet S, use sheet S to output a proposal command based on this determination result.

In this way, by making a proposal by determining whether or not sheet S is to be used in image forming apparatus 1, a user can easily select a recording medium suited for image forming apparatus 1.

Figure 11:
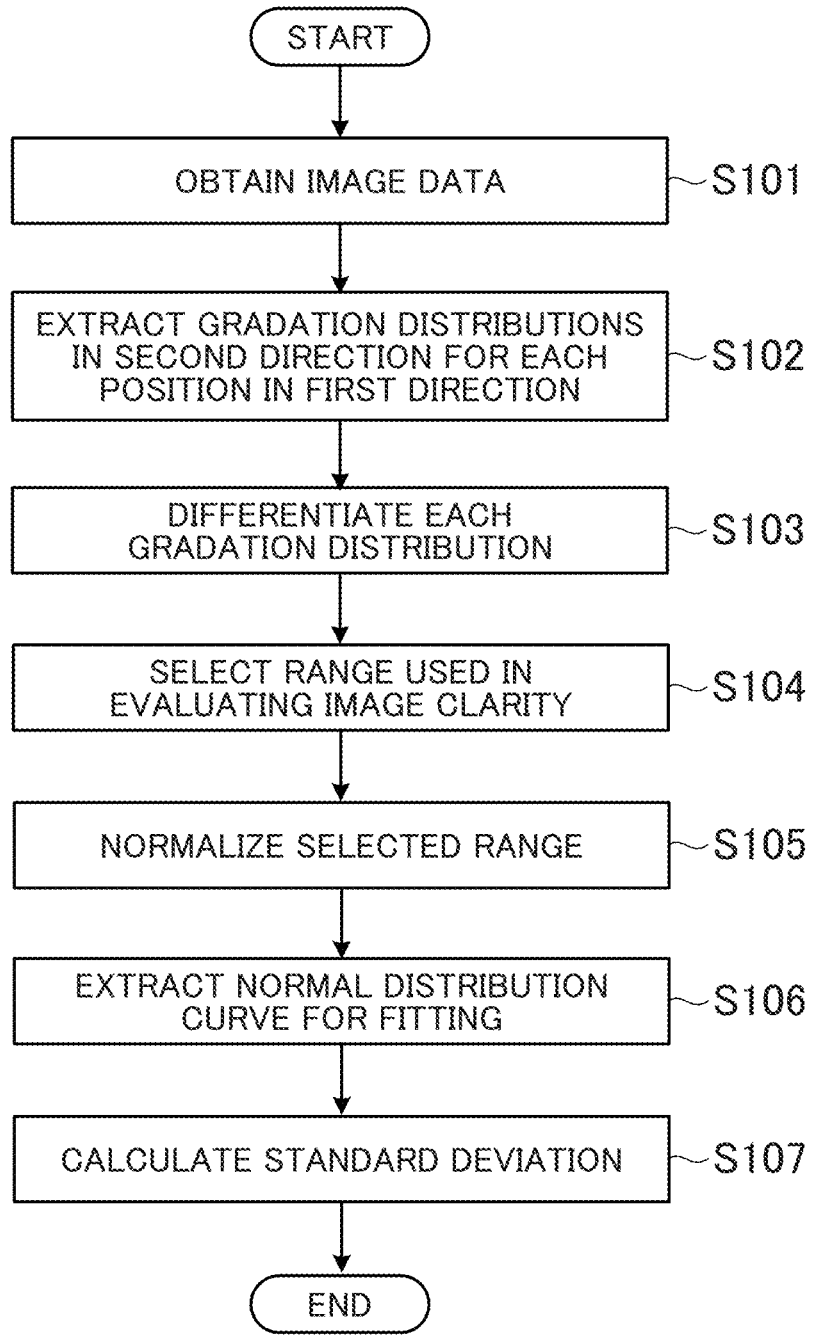
FIG. 11 is a flow chart showing an example of a standard deviation calculation control operation in the evaluation device according to one or more embodiments.

Next, an example of an operation that is performed when evaluation control on a print image is executed in evaluation device 200 is described. First, an example of a standard deviation calculation control operation in evaluation device 200 is described. FIG. 11 is a flow chart showing an example of a standard deviation calculation control operation in evaluation device 200. Processing operations in FIG. 11 are executed as appropriate when, for example, evaluation section 240 or control section 101 of image forming apparatus 1 has received a command for executing evaluation control of a print image.

As shown in FIG. 11, evaluation section 240 obtains image data imaged by imaging section 230 (Step S101). Next, evaluation section 240 extracts gradation distributions in the second direction for each position in the first direction (Step S102).

After extracting the gradation distributions, evaluation section 240 differentiates each gradation distribution (Step S103). After differentiating the gradation distributions, evaluation section 240 selects a range used in evaluating image clarity (Step S104). Then, evaluation section 240 normalizes the selected range (Step S105).

Next, evaluation section 240 extracts a normal distribution curve from the range and fits the range and the normal distribution curve to each other (Step S106). Then, evaluation section 240 calculates a standard deviation (Step S107). Thereafter, the present control ends.

Figure 12:
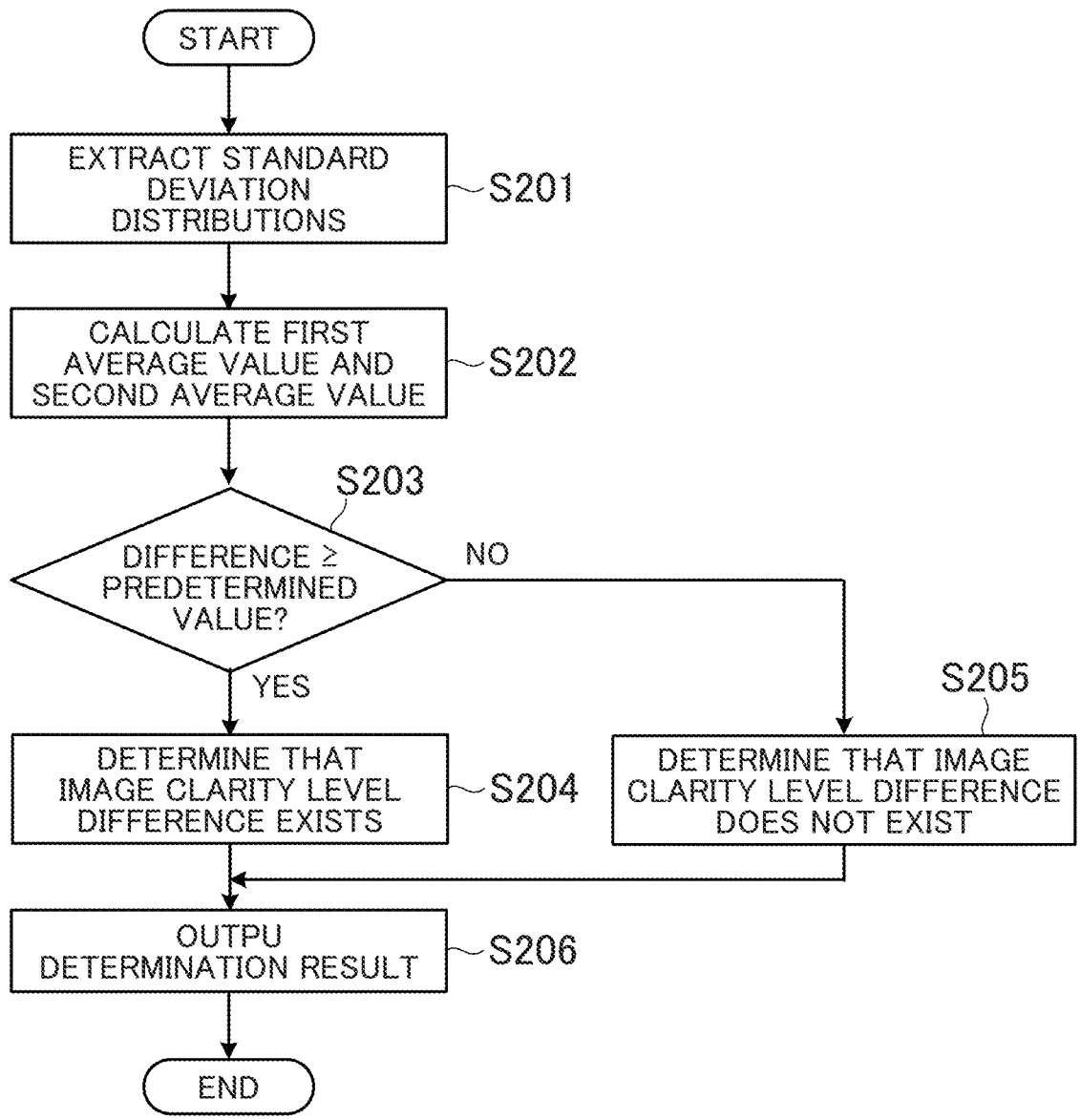
FIG. 12 is a flow chart showing an example of an image-clarity level-difference determination control operation in the evaluation device according to one or more embodiments.

Next, an example of an image-clarity level-difference determination control operation in evaluation device 200 is described. FIG. 12 is a flow chart showing an example of an image-clarity level-difference determination control operation in evaluation device 200. After executing the processing operations in FIG. 11, processing operations in FIG. 12 are executed as appropriate.

As shown in FIG. 12, evaluation section 240 extracts standard deviation distributions (Step S201). Next, evaluation section 240 calculates the first average value and the second average value (Step S202). Then, evaluation section 240 determines whether or not the difference between the first average value and the second average value is greater than or equal to the predetermined value (Step S203).

As a result of the determination, when the difference is greater than or equal to the predetermined value (YES in Step S203), evaluation section 240 determines that an image clarity level difference exists (Step S204). In contrast, when the difference is less than the predetermined value (NO in Step S203), evaluation section 240 determines that an image clarity level difference does not exist (Step S205).

After Step S204 or Step S205, evaluation section 240 outputs the determination result (Step S206). Thereafter, the present control ends.

According to one or more embodiments having the structure described above, by allowing evaluation device 200 to image a print image by using a simple structure, the degree of the image clarity of the print image is quantified. Therefore, it is possible to automatically detect the image clarity of the print image by using a simple structure. As a result, compared to a structure in which a standard image, which is a standard for evaluating the image clarity, and a print image are compared, it is possible to simplify the evaluation step of evaluating the image clarity of the print image.

When the structure is one that uses an object having a standard pattern, if, for example, a foreign substance adheres to the standard pattern, error is increased in evaluating the image clarity. However, in one or more embodiments, since object 210 that does not have a standard pattern is projected as reflecting image 210A onto measurement surface S1 and is imaged to evaluate the image clarity, it is possible to reduce occurrence of such error above. As a result, it is possible to accurately evaluate the image clarity of the print image.

Since object 210 does not have a standard pattern, it is possible to extract gradation distributions having simple shapes. When a standard pattern is formed on the object, in order to show the standard pattern in image data, it is necessary to increase the resolution of the image data, as a result of which the image processing time is increased. However, in one or more embodiments, since gradation distributions having simple shapes are extracted, it is possible to reduce the image processing time, and, thus, to make it easier to evaluate the image clarity.

Since the image clarity of the print image is determined based on the distributions of the standard deviations σ in the first direction, it is possible to accurately detect the image clarity level differences of the print image.

Since illuminating section 220 is one that performs surface-emission, compared to illuminating sections that do not perform surface-emission, it is possible to reduce the influence of measurement errors caused by non-uniform reflected light or distortion of an image that does not depend upon paper quality, and, thus, to evaluate the image clarity with higher precision.

Since object 210 is configured to reflect light, reflected image 210A of object 210 can clearly appear on measurement surface S1. In particular, since the surface of object 210 is mirror-finished, reflected image 210A of object 210 can more clearly appear on measurement surface S1. As a result, it is possible to evaluate with good precision the degree of image clarity by using reflected image 210A.

Since object 210 is a metal member that is mirror-finished, even if, for example, a foreign substance adheres to the surface of object 210 or small flaws occur in the surface of object 210, the foreign substance is removed or a simple grinding operation is performed, so that object 210 can be easily restored to its original state. That is, in one or more embodiments, object 210 can be easily maintained.

Since object 210 is rotatable, it is possible to perform evaluation control at any timing during the movement of sheet S. That is, in one or more embodiments, while ensuring paper passing performance and continuously operating object 210, it is possible to evaluate the image clarity with high precision.

Since object 210 is capable of coming into contact with sheet S, it is possible to endlessly bring object 210 close to sheet S. Therefore, since light can be made to strike measurement surface S1 with good sensitivity, reflected image 210A can clearly appear on sheet S, and, thus, it is possible to evaluate the image clarity with high precision.

Since the print image is a solid image having a coverage rate in the first direction of 100% and having little density unevenness, noise caused by density unevenness is unlikely to enter image data and it is possible to evaluate the image clarity with high precision.

Since the gradation distributions are normalized to fit normal distribution curves thereto, it becomes easy to compare the gradation distributions and the normal distribution curves, and, thus, it is possible to make it easy to evaluate the print image.

Since the gradation distributions are normalized, it is possible to evaluate with the same evaluation measure even when colors of measurement surface S1 differ.

Since the standard deviations based on the results of comparison between the gradation distributions and the normal distribution curves are used as evaluation values, it is possible to evaluate the degree of image clarity by using a simple algorithm.

Since, even for recording media having a low image clarity, the image clarity is evaluated based on the shapes of the gradation distributions, it is possible to evaluate the image clarity with high sensitivity.

For a structure that measures glossiness, since a desired measurement result cannot be obtained unless the incidence angle is a particular value in accordance with the material and the surface nature of the measurement surface, the number of restrictions to setting the device is increased. In contrast, in one or more embodiments, since reflected image 210A that appears on measurement surface S1 only needs to be detected, compared to the structure that measures glossiness, it is possible to reduce the number of restrictions to setting the device and to make the structure compact.

Next, one or more embodiments of the present invention are described. Although object 210 is capable of coming into contact with a recording medium in the embodiments described above, an object may be separated from the recording medium in one or more embodiments.

Figure 13:
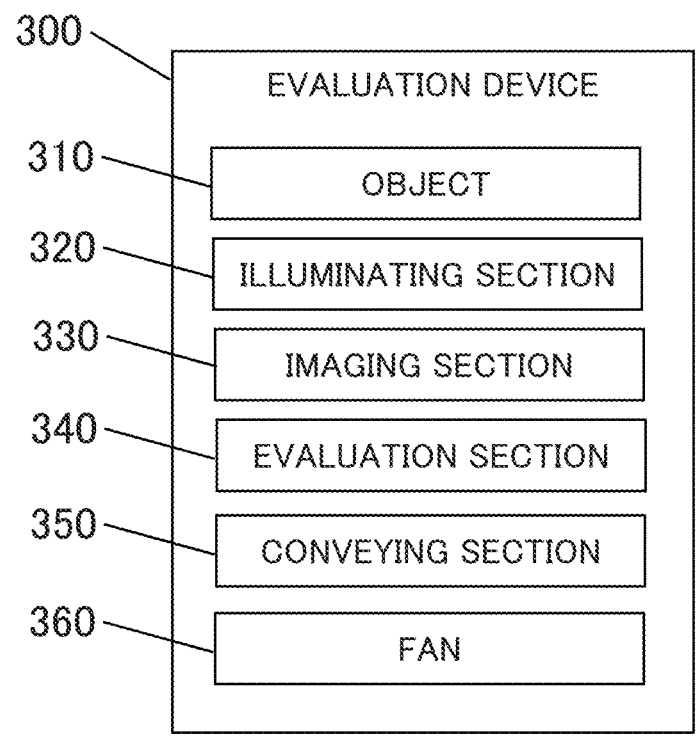
FIG. 13 is a block diagram of an evaluation device according to one or more embodiments.
Figure 14:
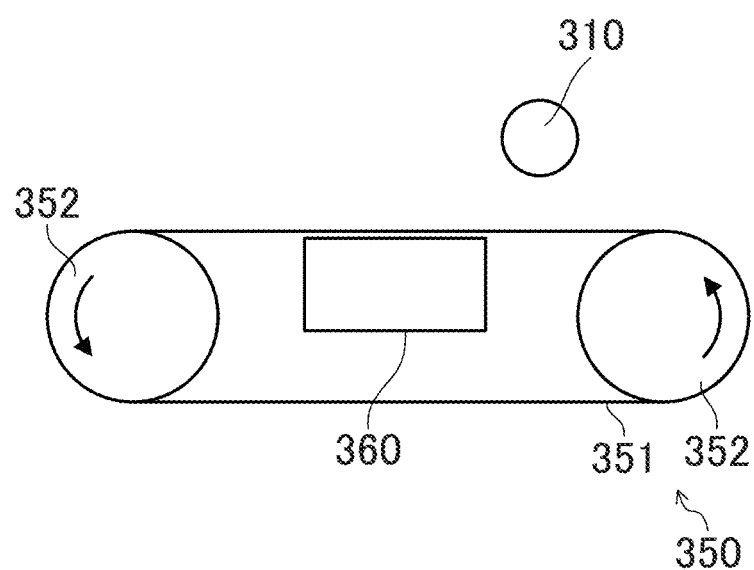
FIG. 14 shows the details of the evaluation device according to one or more embodiments.

As shown in FIG. 13 and FIG. 14, evaluation device 300 according to one or more embodiments includes object 310, illuminating section 320, imaging section 330, evaluation section 340, conveying section 350, and fan 360.

Similarly to the embodiments described above, object 310 is constituted by a metal member and is disposed at a position close to and above conveying section 350.

Similarly to the embodiments described above, illuminating section 320 is disposed at a position facing object 310. Similarly to the embodiments described above, imaging section 330 is disposed at a position that allows a measurement surface on which object 310 has been projected to be imaged. In FIG. 14, illuminating section 320 and imaging section 330 are not shown.

Conveying section 350 is a member that conveys sheet S and includes a conveying belt 351 and one tension roller pair 352.

Conveying belt 351 is an endless belt. Tension roller pair 352 is a roller pair along which conveying belt 351 is tightly stretched. Either one of the tension rollers of tension roller pair 352 is a driving roller, and by controlling the driving of the driving roller by a control section (not shown), conveying belt 351 is rotated and conveys sheet S.

Fan 360 sucks air from a back side of an upper surface of conveying belt 351. Conveying belt 351 has a plurality of holes, and fan 360 sucks air to cause sheet S on conveying belt 351 to be attracted to conveying belt 351 via the holes. This causes the flatness of sheet S to be maintained.

In such a structure, similarly to the embodiment described above, by illuminating object 310 with light emitted from illuminating section 320, light reflected from object 310 is incident upon sheet S on conveying belt 351. Then, by disposing imaging section 330 at an optical path of light reflected from sheet S, an image such as that shown in, for example, FIG. 5 is obtained by imaging section 330.

Evaluation section 340 is similar to evaluation section 240 according to the embodiments described above. An evaluation method by evaluation section 340 is similar to that according to the embodiments described above.

Even in such a structure, it is possible to automatically detect the image clarity of a print image and to accurately evaluate the image clarity of the print image.

In one or more embodiments, since an evaluation value is calculated based on gradation distributions having simple shapes, compared to a structure that includes an object having a plurality of standard patterns, it is possible to widen an allowable range of the distance between object 310 and sheet S. This is because, when an object has a plurality of standard patterns, from the viewpoint of making clearer a reflected image, it is necessary to bring the object closer to the measurement surface. From the viewpoint of causing reflected image 210A to appear clearly, object 310 may be brought closer to measurement surface S1.

Next, one or more embodiments of the present invention are described. Although sheet S is attracted to conveying belt 351 in the embodiments described above, a guide plate that supports sheet S that is conveyed may be provided in one or more embodiments.

Figure 15:
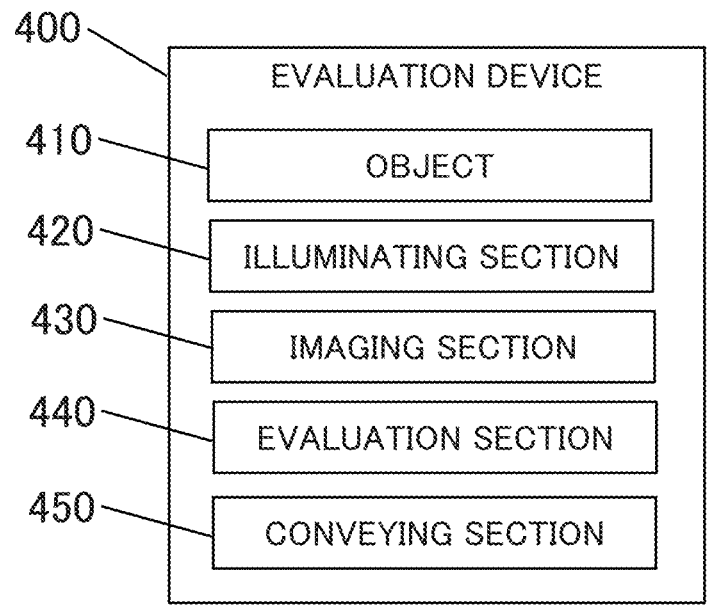
FIG. 15 is a block diagram of an evaluation device according to one or more embodiments.
Figure 16:
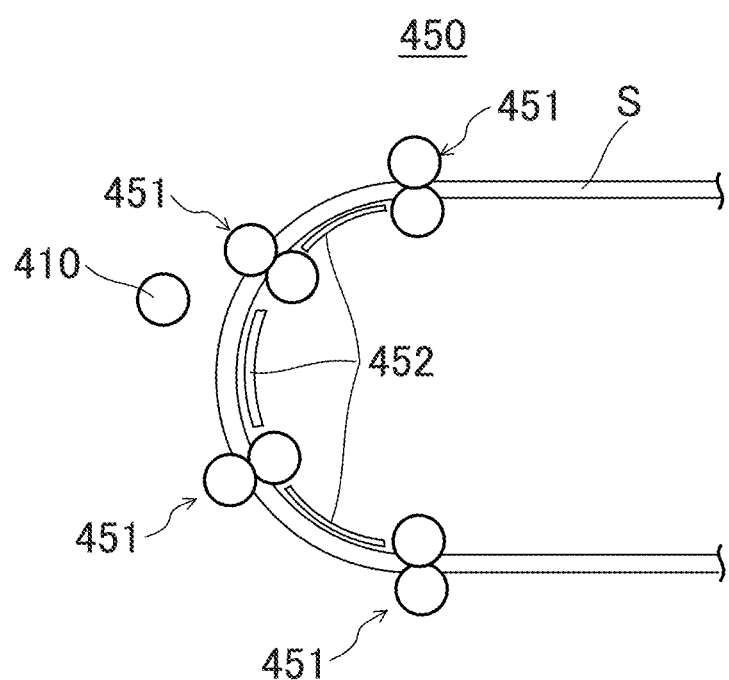
FIG. 16 shows the details of the evaluation device according to one or more embodiments.

Specifically, as shown in FIG. 15 and FIG. 16, evaluation device 400 according to one or more embodiments includes object 410, illuminating section 420, imaging section 430, evaluation section 440, and conveying section 450.

Similarly to the embodiments described above, object 410 is constituted by a metal member, and is disposed at, for example, a position that is close to conveying section 450 on the left of a conveying path of conveying section 450.

Similarly to the embodiments described above, illuminating section 420 is disposed at a position facing object 410. Similarly to the embodiments described above, imaging section 430 is disposed at a position that allows a measurement surface on which object 410 has been projected to be imaged. In FIG. 16, illuminating section 420 and imaging section 430 are not shown.

Conveying section 450 includes a plurality of conveyance roller pairs 451 and a plurality of guide plates 452. At a conveying path of sheet S, the plurality of conveyance roller pairs 451 are each disposed in a conveying direction of sheet S. In the example shown in FIG. 16, the conveying path is, for example, a substantially U-shaped path having an open right side.

The plurality of guide plates 452 are each provided between two conveyance roller pairs 451 that are adjacent to each other, and guide the conveyance of sheet S while supporting the back side of sheet S that is conveyed along the conveying path. Guide plates 452 prevent flexing of sheet S that is conveyed along the conveying path.

Evaluation section 440 is similar to evaluation section 240 according to the embodiments described above. An evaluation method by evaluation section 440 is similar to that according to the embodiments described above.

In such a structure, similarly to the embodiments described above, by illuminating object 410 with light emitted from illuminating section 420, light reflected from object 410 is incident upon sheet S at the conveying path. By disposing imaging section 430 at an optical path of light reflected from sheet S, an image such as that shown in, for example, FIG. 5 is obtained.

Even such a structure makes it possible to automatically detect the image clarity of a print image and to accurately evaluate the image clarity of the print image.

Next, one or more embodiments of the present invention are described. In the embodiments described above, the number of imaging operations by the imaging section during the movement of sheet S was not mentioned. In one or more embodiments, the number of imaging operations by the imaging section is a plurality of times. The structure of one or more embodiments is similar to the structure of the embodiments described above.

That is, evaluation section 240 determines whether or not the image clarity of a print image is non-uniform based on the variation amounts of respective standard deviations in the first direction for a plurality of positions in the second direction.

Specifically, imaging section 230 obtains image data a plurality of times at a predetermined time interval during the movement of sheet S.

Figure 17:
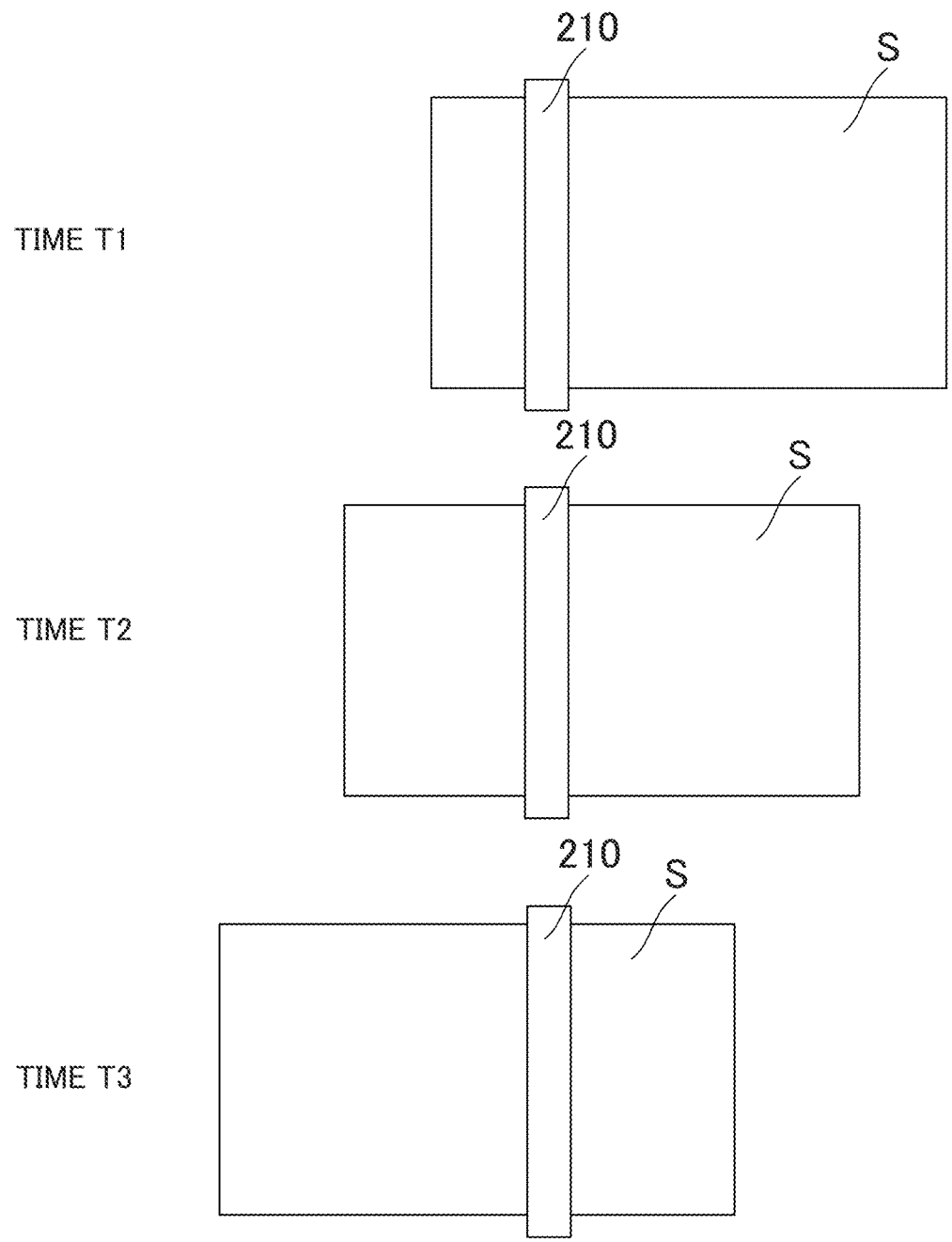
FIG. 17 shows the relationships of the positions of a sheet with respect to an object when imaging at each time according to one or more embodiments.

As shown in FIG. 17, as time passes, that is, as time T1, time T2 and time T3 pass, each position on sheet S in the movement direction passes the position of object 210, and imaging section 230 images a print image at each time, that is, time T1, time T2, and time T3.

Figures 18, 19:
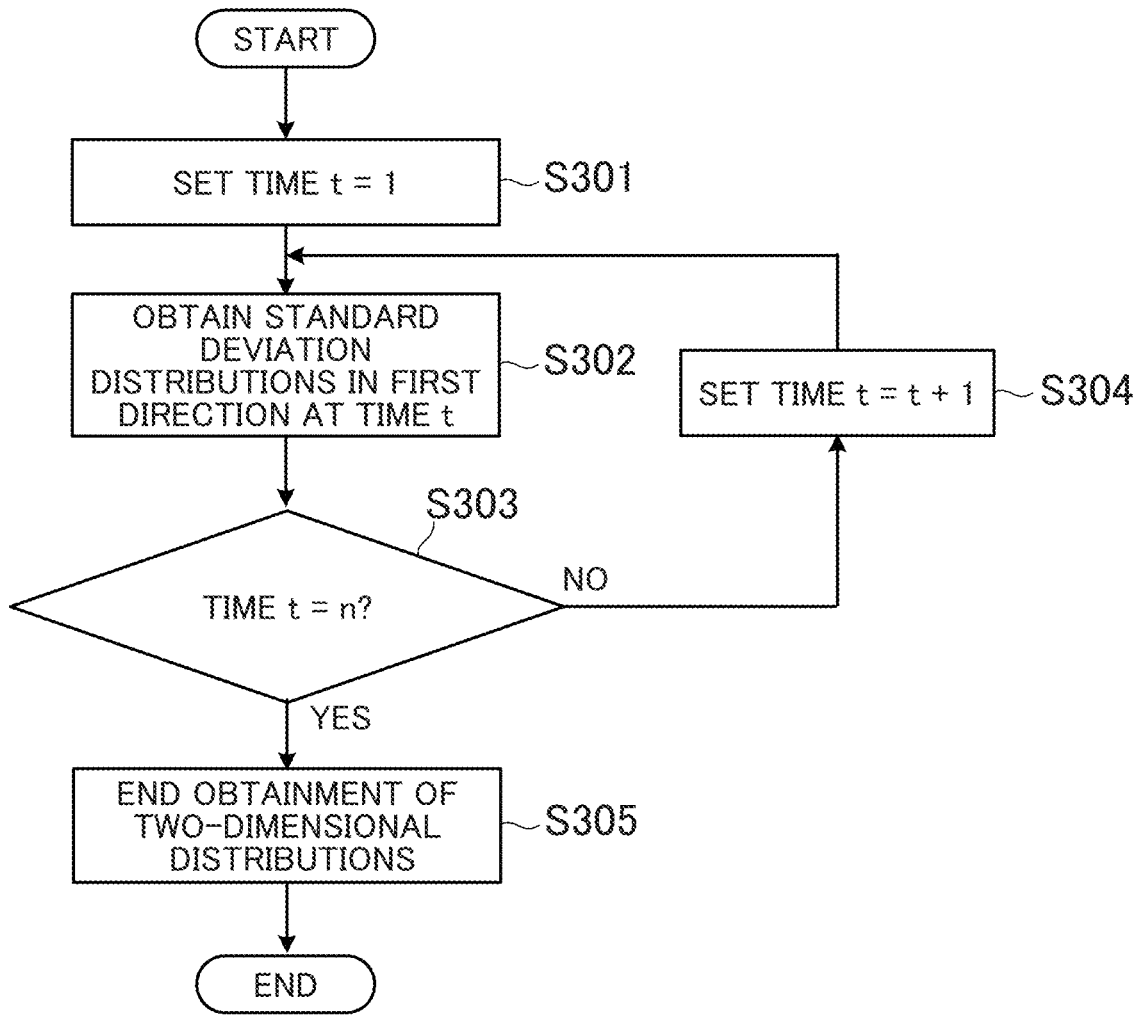
FIG. 18 shows two-dimensional distributions of standard deviations according to one or more embodiments.
FIG. 19 is a flow chart of an example of a two-dimensional-distribution obtaining control operation in the evaluation device according to one or more embodiments.

As shown in FIG. 18, this makes it possible to obtain two-dimensional distributions of the standard deviations at respective positions in the first direction and at the respective positions in the movement direction (the second direction). Y1 in FIG. 18 denotes the positions in the movement direction at time T1. Y2 in FIG. 18 denotes the positions in the movement direction at time T2. Y3 in FIG. 18 denotes the positions in the movement direction at time T3.

$\sigma 11$, $\sigma 12$, $\sigma 13$, etc. in Y1, $\sigma 21$, $\sigma 22$, $\sigma 23$, etc. in Y2, and $\sigma 31$, $\sigma 32$, $\sigma 33$, etc. in Y3 denote the standard deviations in the first direction for the respective positions in the movement direction.

Next, an example of an operation when obtainment control of two-dimensional distributions of standard deviations according to one or more embodiments is executed is described. FIG. 19 is a flow chart of an example of a two-dimensional-distribution obtaining control operation in evaluation device 200. Processing operations in FIG. 19 are executed as appropriate when evaluation section 240 or control section 101 of image forming apparatus 1 has received a command for executing evaluation control of a print image.

As shown in FIG. 19, evaluation section 240 sets time t for evaluation measurement to 1 (Step S301). Then, evaluation section 240 obtains standard deviation distributions in the first direction at time t (Step S302). Regarding the processing operation in Step S302, for example, the standard deviation distributions are obtained in accordance with the flow chart shown in FIG. 11.

Next, evaluation section 240 determines whether or not time t=n (Step S303). n denotes the last time of the evaluation measurement. As a result of the determination, if time=n does not hold (NO in Step S303), evaluation section 240 sets time t=t+1 (Step S304). After Step S304, the process returns to Step S302.

In contrast, if time t=n (YES in Step S303), evaluation section 240 ends the obtainment of the two-dimensional distributions (Step S305). After Step S305, the present control ends.

In such a structure, evaluation section 240 detects whether or not image clarity level differences exist at the respective positions on sheet S in the movement direction. Therefore, since it is possible to thoroughly evaluate the image clarity of a print image, it is possible to increase the precision with which the image clarity is determined.

Although in the embodiments described above, when the difference between the first average value and the second average value is greater than or equal to the predetermined value, evaluation section 240 determines that the print image is non-uniform, the present invention is not limited thereto. For example, when the difference between at least one of the first average value and the second average value and an overall average value is greater than or equal to the predetermined value, evaluation section 240 may determine that the print image is non-uniform. The first average value, the second average value, and the overall average value are the same as the first average value, the second average value, and the overall average value in the embodiments described above.

Although in the embodiments described above, evaluation section 240 determines the image clarity only in a state in which a print image has been formed on a recording medium, the present invention is not limited thereto. Evaluation section 240 may determine the image clarity of an image portion and the image clarity of a non-image portion on a recording medium. Evaluation section 240 causes a storage section to store the results of evaluation of the image clarity of the image portion and the image clarity of the non-image portion. The storage section may be provided at evaluation device 200, or may be provided at image forming apparatus 1.

Therefore, for example, when image forming apparatus 1 having a glossiness control function is used, image forming apparatus 1 refers to the storage section, and compares the result of determination of the image clarity of the image portion and the result of determination of the image clarity of the non-image portion. Based on the result of comparison, image forming apparatus 1 determines a proper gloss-control target value.

That is, by using evaluation device 200, it is possible to efficiently determine the gloss-control target value.

Although in the embodiments described above, gradation is described as an example of a parameter related to the brightness of image data, the present invention is not limited thereto. For example, luminance or other quantities may be used as a parameter related to the brightness of image data.

Although in the embodiments described above, the evaluation device is provided at the post-processing device 2 of image forming system 100, the present invention is not limited thereto. For example, the evaluation device may be provided in image forming apparatus 1, or may be provided as a device that is separate from the image forming system.

Although in the embodiments described above, the object is constituted by a metal member, the present invention is not limited thereto. As long as members are reflective, members other than a metal member may be used.

Although in the embodiments described above, the illuminating section is configured to perform surface-emission, the present invention is not limited thereto. As long as light can illuminate the entire object in the first direction, the illuminating section need not be configured to perform surface-emission.

Although in the embodiments described above, the surface of the object is mirror-finished, the present invention is not limited thereto. The surface of the object need not be mirror-finished.

The embodiments described above are no more than specific examples in carrying out the present invention, and the technical scope of the present invention is not to be construed in a limitative sense due to the specific examples. That is, one or more embodiments of the present invention can be carried out in various forms without departing from the spirit and the main features thereof.

Lastly, an evaluation experiment by the evaluation device according to one or more embodiments is described. An illuminating section and an imaging section that are used in the experiment below are previously corrected to suppress non-uniformity of the amount of light received caused by, for example, the distance between the imaging section and an object and sensitivity non-uniformity of the imaging section.

Example 1 in the present experiment corresponds to an example of one or more embodiments, and Example 2 corresponds to an another example of one or more embodiments. An object in each example is an SUS having a diameter of 8 mm. The distance between the object and a measurement surface in Example 2 is 2 mm.

Figure 20:
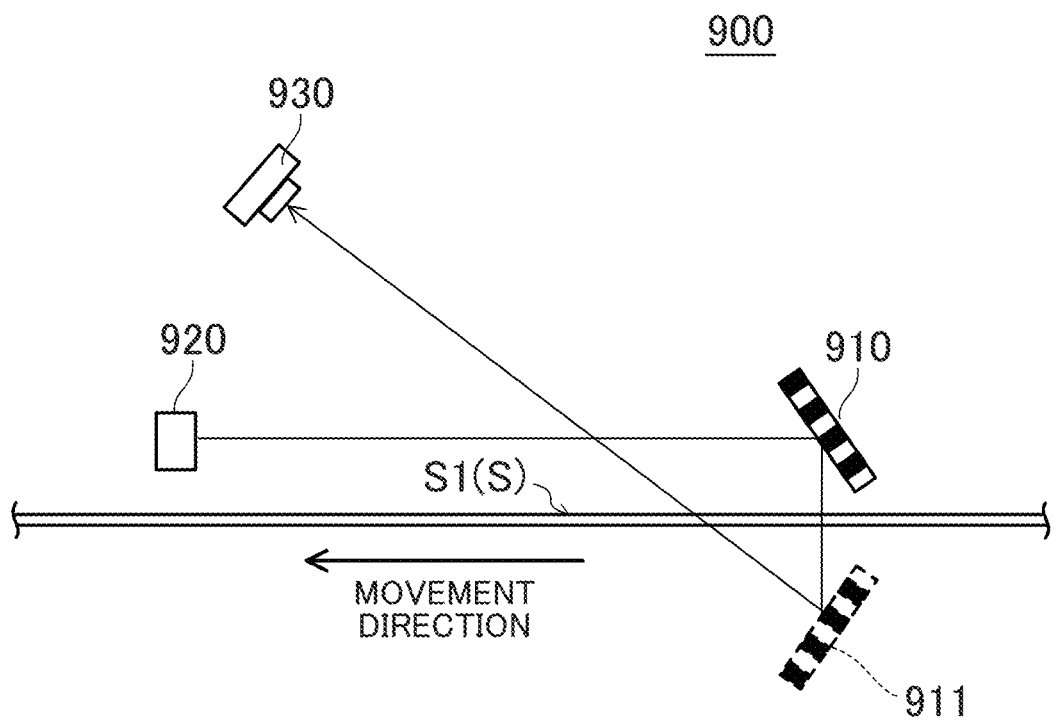
FIG. 20 shows the details of an evaluation device according to Comparative Example 1 according to one or more embodiments.

As shown in FIG. 20, evaluation device 900 according to Comparative Example 1 in the present experiment includes object 910, illuminating section 920, and imaging section 930.

Object 910 is a resin plate having a striped pattern in which white stripes and black stripes are alternately disposed side by side from the top. Object 910 is disposed obliquely with respect to sheet S that is conveyed so as to be positioned closer to the top towards a downstream side in the movement direction of sheet S. A lower end portion of object 910 is separated by 2 mm from sheet S that is conveyed.

Illuminating section 920 is an illuminating device that performs surface-emission as in the examples mentioned above, and faces object 910 on the downstream side in the movement direction with respect to object 910.

Imaging section 930 is disposed between object 910 and illuminating section 920 in the movement direction, and images virtual image 911 of object 910 by causing object 910 to reflect light emitted from illuminating section 920 to sheet S.

When the light emitted from illuminating section 920 strikes object 910, the light is reflected toward measurement surface S1 of sheet S by object 910. Imaging section 930 is disposed at a position that allows virtual image 911 of object 910 to be imaged on a side opposite to object 910 with sheet S interposed therebetween.

Image data imaged by imaging section 930 is transmitted to a control section (not shown). The control section extracts a gradation distribution in the movement direction in the imaged image data. The control section corrects the inclination in the movement direction of the extracted gradation distribution, calculates a standard deviation of the corrected gradation distribution, and makes this value an evaluation value.

Figure 21:
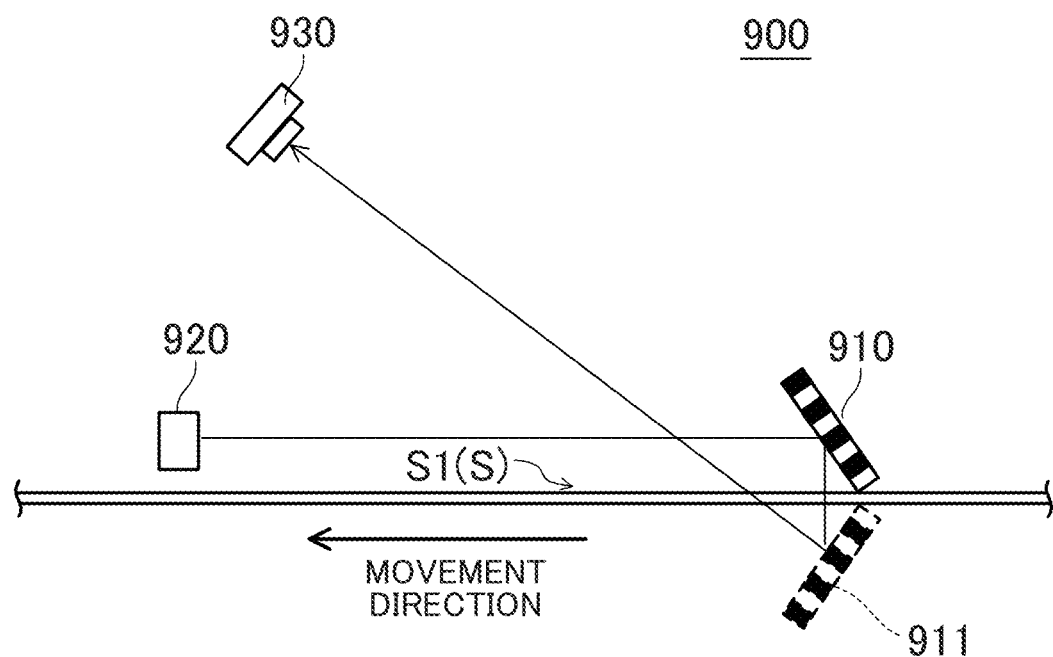
FIG. 21 shows the details of an evaluation device according to Comparative Example 2 according to one or more embodiments.

As shown in FIG. 21, evaluation device 900 in Comparative Example 2 in the present experiment has substantially the same structure as evaluation device 900 according to Comparative Example 1. A lower end portion of object 910 in Comparative Example 2 corresponds to a portion that is brought into contact with sheet S that is conveyed.

In the present experiment, cast-coated paper (glossiness of surface at 60 degrees is 73), gloss-coated paper (glossiness of surface at 60 degrees is 28), and high-quality paper (glossiness of surface at 60 degrees is 20) are used as recording media. For the recording media, A3 recording media are used. Print images on the recording media are black solid images whose coverage rate is 100% on the entire surfaces of the recording media (for example, A3 size). The glossiness of the surface of each print image at 60 degrees is 30.

Figure 22:
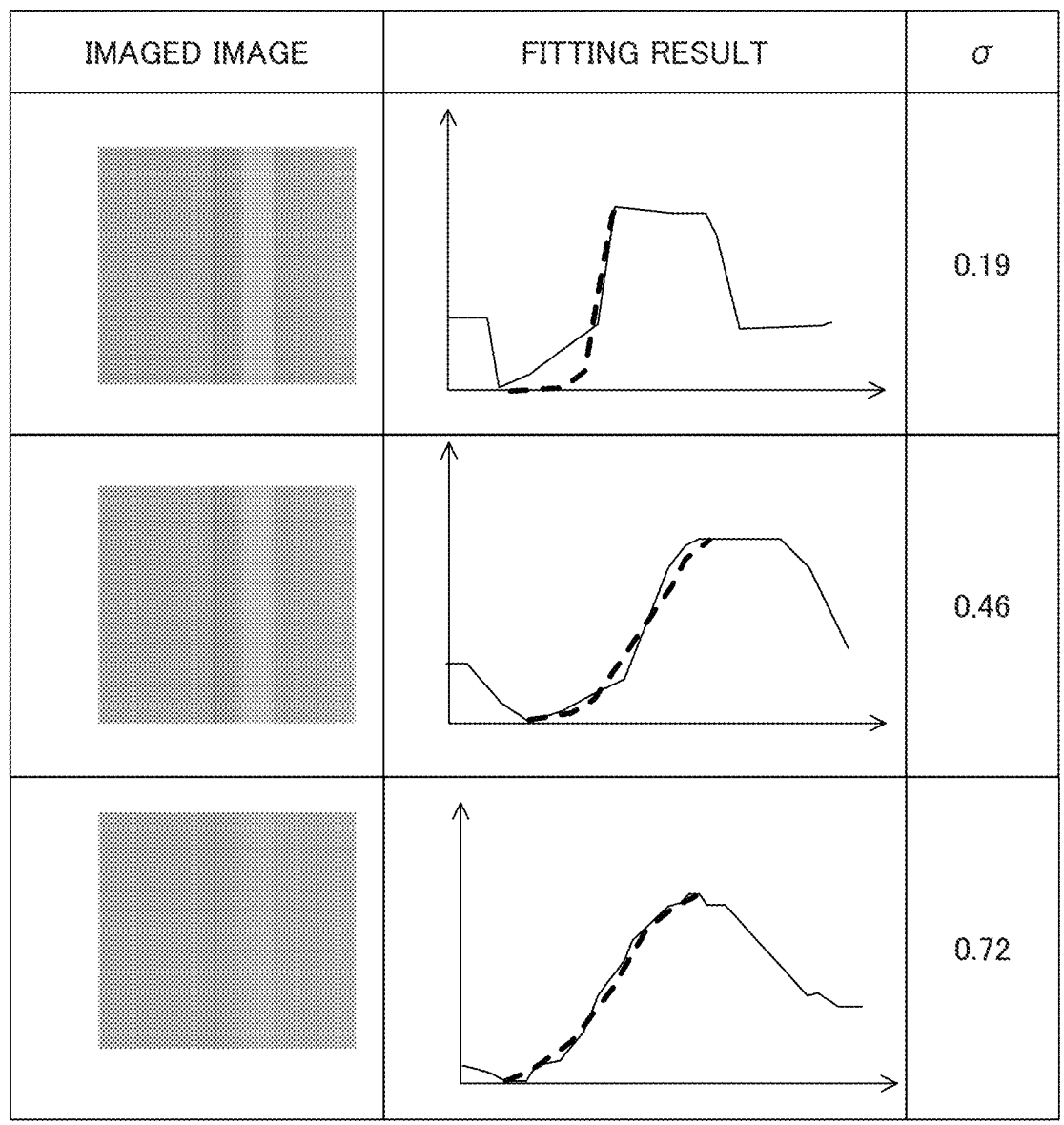
FIG. 22 shows an experimental result of each recording medium in Example 1 according to one or more embodiments.
Figure 23:
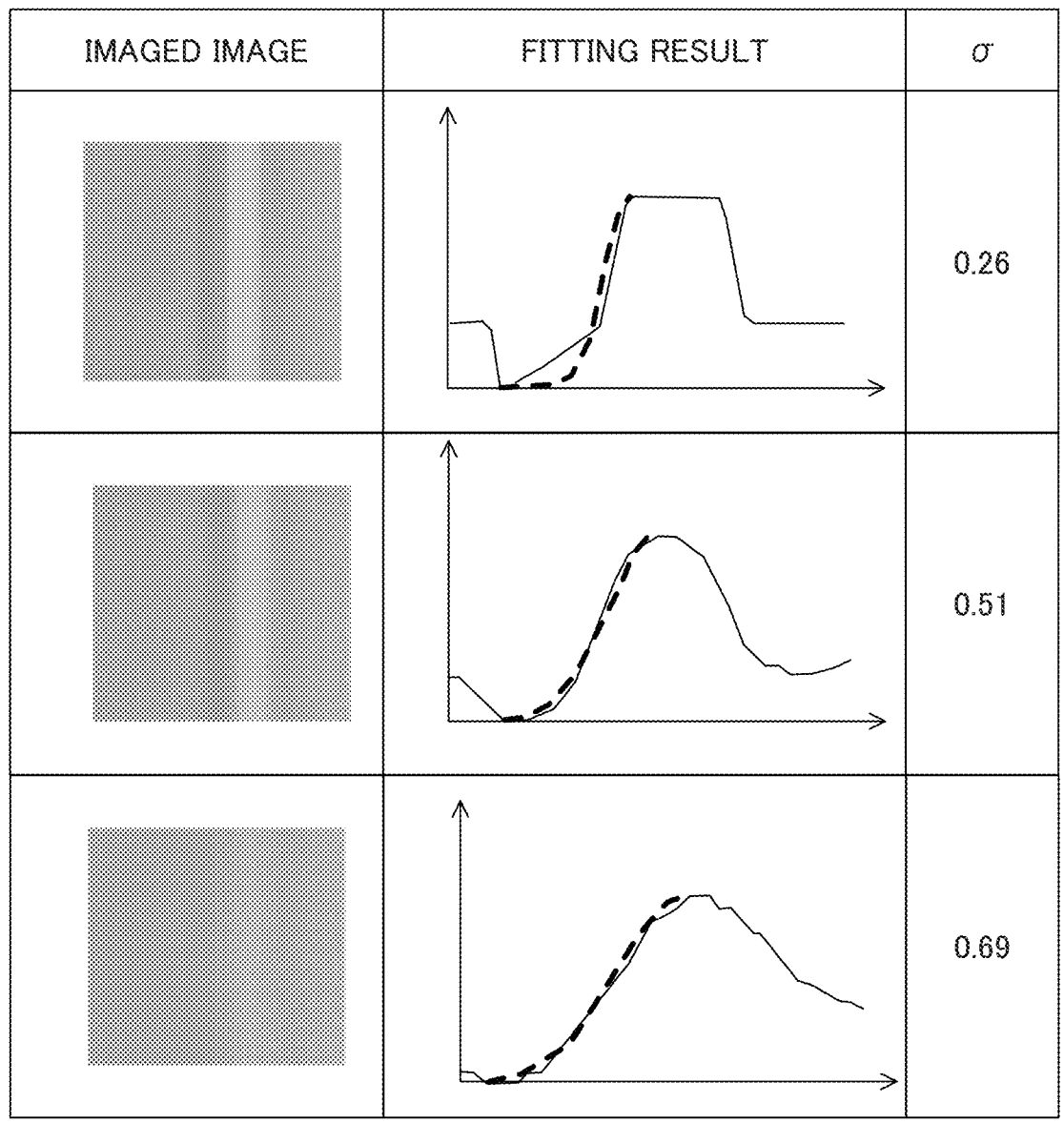
FIG. 23 shows an experimental result of each recording medium in Example 2 according to one or more embodiments.

The experimental results of the respective recording media in Example 1 and Example 2 are given in FIG. 22 and FIG. 23. FIG. 22 and FIG. 23 show, for each recording medium, an imaged image, the result of fitting a gradation distribution corresponding to the image and a normal distribution, and a standard deviation calculated based on the result. Each fitting result is such that the solid line corresponds to the gradation distribution and the broken line corresponds to the normal distribution. The gradation distribution is a normalized distribution.

As a result, as shown in FIG. 22, in Example 1, the standard deviation for the cast-coated paper is 0.19, the standard deviation for the gloss-coated paper is 0.46, and the standard deviation for the high-quality paper is 0.72. As shown in FIG. 23, in Example 2, the standard deviation for the cast-coated paper is 0.26, the standard deviation for the gloss-coated paper is 0.51, and the standard deviation for the high-quality paper is 0.69.

Figure 24:
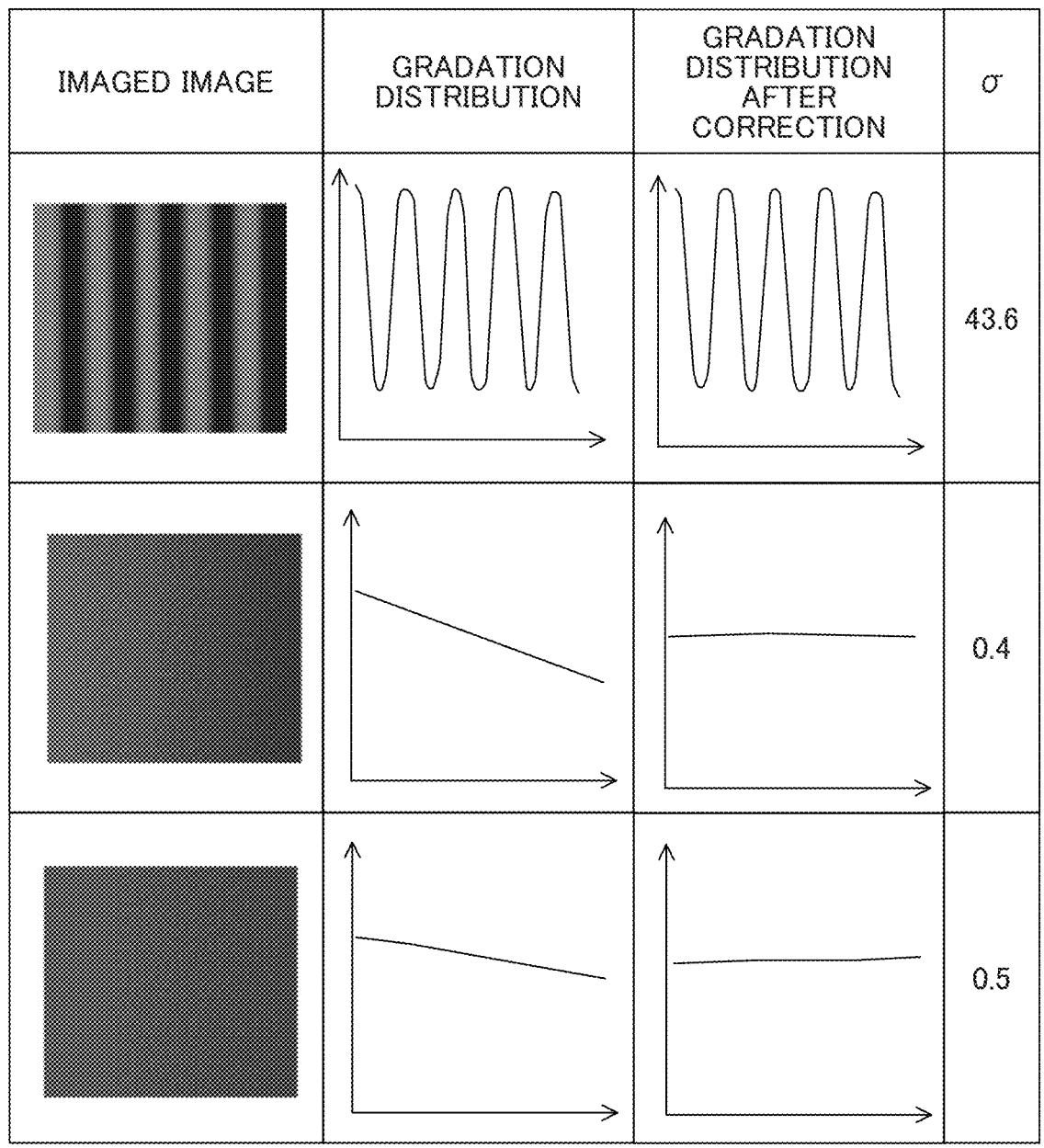
FIG. 24 shows an experimental result of each recording medium in Comparative Example 1 according to one or more embodiments.
Figure 25:
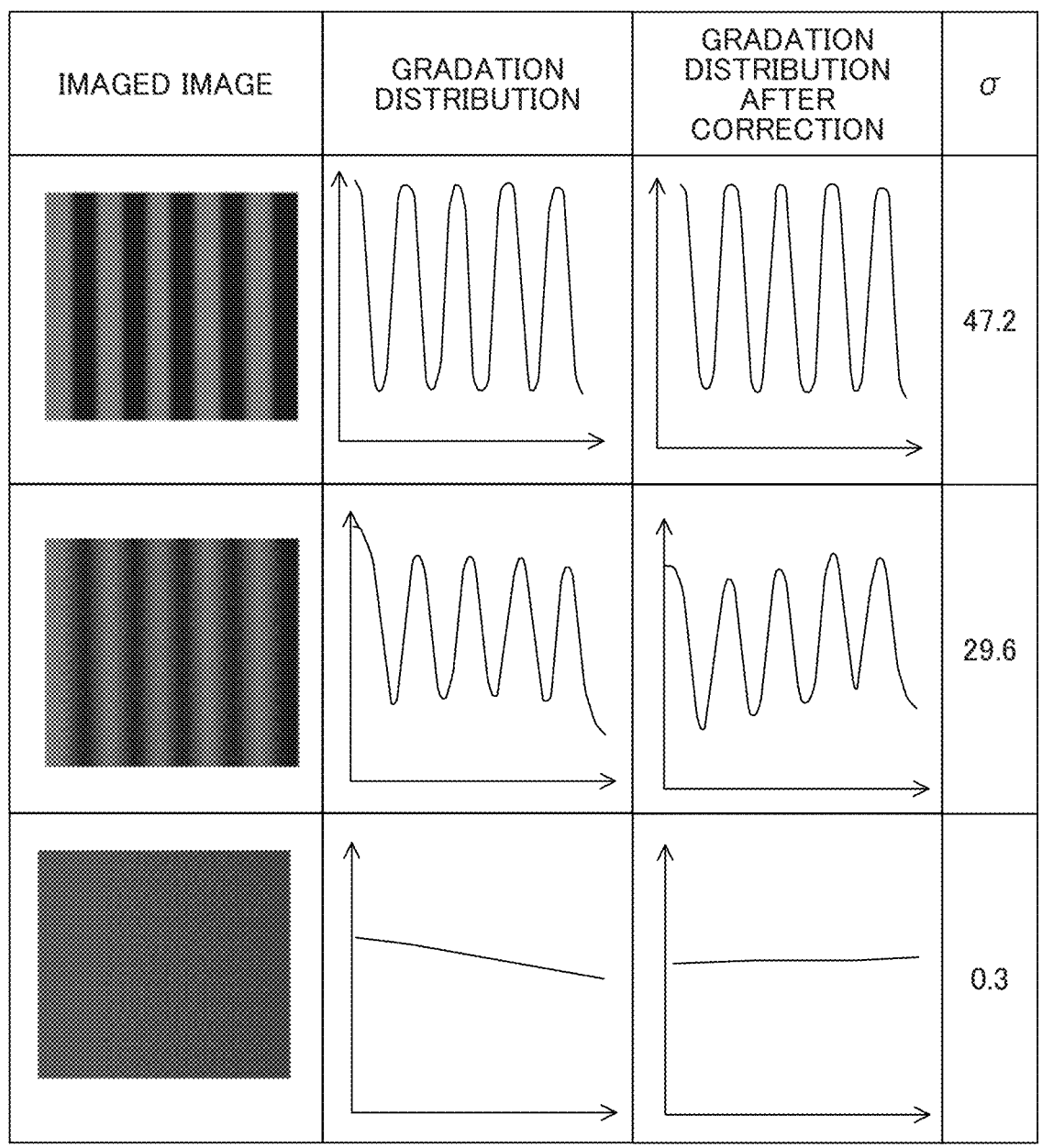
FIG. 25 shows an experimental result of each recording medium in Comparative Example 2 according to one or more embodiments.

The experimental results of the respective recording media in Comparative Example 1 and Comparative Example 2 are given in FIG. 24 and FIG. 25. FIG. 24 and FIG. 25 show, for each recording medium, an imaged image, a gradation distribution corresponding to the image, a result obtained by correcting the inclination of the gradation distribution, and a standard deviation based on the result.

As a result, as shown in FIG. 24, in Comparative Example 1, the standard deviation for the cast-coated paper is 43.6, the standard deviation for the gloss-coated paper is 0.4, and the standard deviation for the high-quality paper is 0.5. As shown in FIG. 25, in Comparative Example 2, the standard deviation for the cast-coated paper is 47.2, the standard deviation for the gloss-coated paper is 29.6, and the standard deviation for the high-quality paper is 0.3.

Next, in the present experiment, a case in which the standard deviations of the respective examples and the respective comparative examples obtained in this way were calculated and a case in which print images obtained in the respective examples and the respective comparative examples were visually evaluated are compared with each other. Evaluations for determining whether the evaluation results based on the calculations of the standard deviations properly conform with the visual evaluation results are performed.

The values of the respective standard deviations in FIG. 22 to FIG. 25 are adjusted in accordance with a ratio when their maximum values are defined as 1. For example, in FIG. 22, since the maximum value of the standard deviations is 0.72, the other standard deviation values are adjusted in accordance a ratio with respect to 0.72 that is defined as 1.

Figure 26:
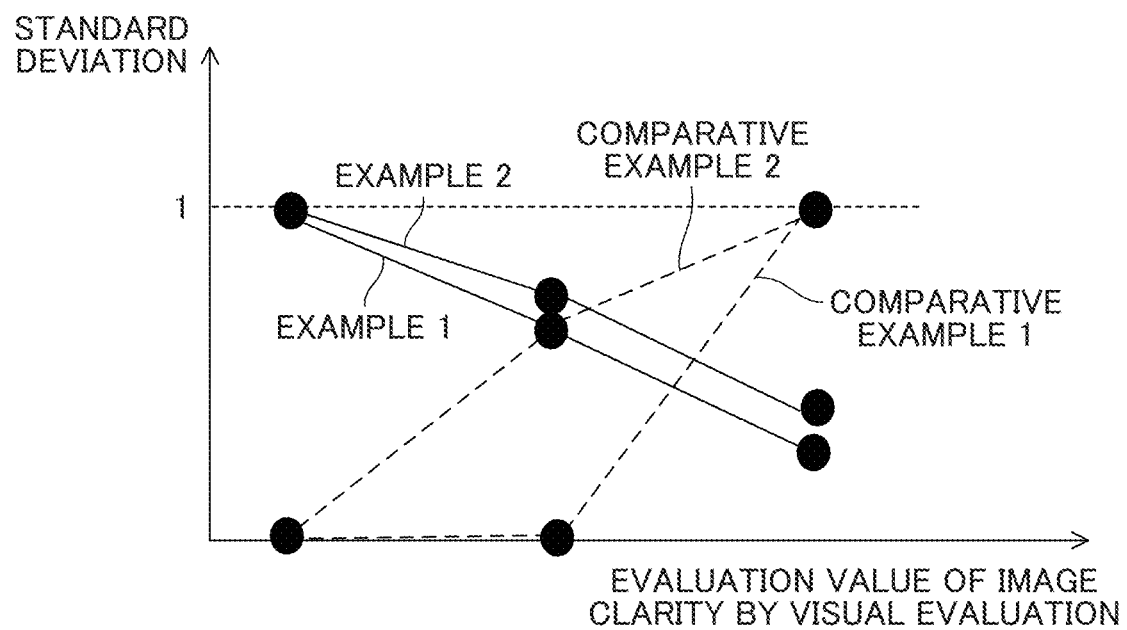
FIG. 26 shows the relationships between evaluation values of image clarity and standard deviation by visual confirmation according to one or more embodiments.

Regarding the visual evaluations, a magnitude inferring method is performed to, when the image clarity of a smooth acrylic plate surface is 100, make a subject for the experiment answer what the subject thinks the image clarities of evaluation samples are. FIG. 26 shows relationships of standard deviations with respect to image clarity based on visual confirmation. FIG. 26 shows that the evaluation values of the image clarity based on the visual confirmation become higher towards the right.

As shown in FIG. 26, in Comparative Example 1, the evaluation result of the standard deviation even at a portion where the image clarity is visually determined as being an approximately intermediate value is substantially zero, and is the same as the evaluation result of the standard deviation at a portion where the image clarity is visually determined as being low. Therefore, in Comparative Example 1, the result is that the portion where the image clarity is visually determined as being an approximately intermediate value and the portion where the image clarity is visually determined as being low cannot be distinguished, so that sufficient sensitivity cannot be obtained with regard to evaluating image clarity.

In Comparative Example 2, the result is that the standard deviation varies in accordance with the differences in the evaluation results based on visual confirmation, such as the higher the image clarity based on the visual confirmation, the higher the standard deviation, as a result of which sufficient sensitivity in accordance with the degree of image clarity is obtained. However, in Comparative Example 2, since object 910 is in contact with sheet S, it is confirmed that the movement of sheet S is frequently retarded. Therefore, the device of Comparative Example 2 is not suitable as an evaluation device for print images.

In contrast, in Example 1 and Example 2, the result is that the standard deviation varies in accordance with the differences in the visual evaluation results based on visual confirmation, such as the lower the image clarity, the larger the standard deviation, as a result of which it is confirmed that sufficient sensitivity in accordance with the degree of image clarity is obtained.

In Example 1 and Example 2, since the object rotates in accordance with the movement of sheet S, or the object is separated from sheet S, the movement of sheet S is not retarded as it is in Comparative Example 2. Therefore, it is confirmed that the devices of Example 1 and Example 2 are suitable as evaluation devices for print images.

Next, under a printing condition in which an image clarity level difference occurs randomly with a probability of 50%, print images, which are solid images having a coverage rate of 100% in the first direction, are formed on 10000 recording media having an A3 size to determine whether or not there exit image clarity level differences in Example 1 and Example 2. Based on the correctness percentage of determination results, the precision for non-uniformity of image clarity in Example 1 and Example 2 is evaluated. FIG. 27 shows experimental results related to the correctness percentage of results obtained by determining whether or not image clarity level differences exist.

In FIG. 27, the "visual confirmation" columns indicate, respectively, the visually confirmed number of sheets where there are image clarity level differences and the visually confirmed number of sheets where there are no image clarity level differences. The "detection" columns indicate, respectively, the number of sheets where there are image clarity level differences and the number of sheets where there are no image clarity level differences, the numbers of sheets being confirmed based on the results of determination by the evaluation devices. The "correctness percentage" columns indicate the ratios of the number of sheets based on "detection" with respect to the number of sheets based on "visual confirmation".

When, in the visual confirmation, it is confirmed that there are no image clarity level differences and, in the detection by the evaluation devices, it is confirmed that there are image clarity level differences, gentle changes in image clarity occur at a boundary portion between a portion having a high image clarity and a portion having a low image clarity. In this case, although there is actually a large difference between the maximum value of the image clarity and the minimum value of the image clarity, it is difficult to visually determine this difference.

When, in the visual confirmation, it is confirmed that there are image clarity level differences and, in the detection by the evaluation devices, it is confirmed that there are no image clarity level differences, a boundary portion between a portion having a high image clarity and a portion having a low image clarity is clear, and sharp changes in image clarity occur at this portion. In this case, even if the difference between the maximum value of the image clarity and the minimum value of the image clarity is small, this difference can be easily seen.

According to FIG. 27, it is confirmed that the correctness rate when image clarity level differences exist and the correctness rate when image clarity level differences do not exist are both high, or greater than 70%, in both Example 1 and Example 2.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An evaluation device that evaluates an image clarity of a print image, the evaluation device comprising:
   an object that is projected onto a measurement surface of a recording medium;
   an illuminator that makes the object projected onto the measurement surface;
   an imager that images the measurement surface on which the object has been projected to obtain image data; and
   a hardware processor that, based on a distribution of parameters related to a brightness of the image data, quantifies a degree of the image clarity into a numerical value and defines the numerical value as an evaluation value of the image clarity, wherein
   the object contacts the recording medium and rotates as the recording medium moves.

2. The evaluation device according to claim 1, wherein the object has a length extending in a first direction; and
   the illuminator comprises a surface that has a length extending in the first direction and emits light toward the object from an entirety of the surface.

3. The evaluation device according to claim 1, wherein
   the object reflects light emitted from the illuminator toward the measurement surface; and
   the imager images a portion of the measurement surface to which the light has been reflected from the object.

4. The evaluation device according to claim 3, wherein a surface of the object is mirror-finished.

5. The evaluation device according to claim 1, wherein
   the object has a length extending in a first direction; and
   the print image is a solid image having a coverage rate of 100% in the first direction.

6. The evaluation device according to claim 1, wherein the hardware processor evaluates the image clarity of an image portion on the recording medium and the image clarity of a non-image portion on the recording medium, and stores a result of evaluation of the image clarity of the image portion and the image clarity of the non-image portion in a storage device.

7. An evaluation device that evaluates an image clarity of a print image, the evaluation device comprising:
   an object that is projected onto a measurement surface of a recording medium;
   an illuminator that makes the object projected onto the measurement surface;
   an imager that images the measurement surface on which the object has been projected to obtain image data; and
   a hardware processor that, based on a distribution of parameters related to a brightness of the image data, quantifies a degree of the image clarity into a numerical value and defines the numerical value as an evaluation value of the image clarity, wherein
   the object has a length extending in a first direction; and
   the hardware processor, based on the image data, extracts a plurality of distributions in a second direction orthogonal to the first direction and parallel to the measurement surface at a plurality of positions in the first direction, and calculates the evaluation value from the distributions that have been extracted.

8. The evaluation device according to claim 7, wherein the hardware processor selects an evaluation range including a position at which the parameters become maximum values in the image data.

9. The evaluation device according to claim 8, wherein the hardware processor determines the evaluation range based on a previously measured position in the image data.

10. The evaluation device according to claim 8, wherein
    the illuminator faces the object;
    the imager images the measurement surface at a location between the illuminator and the object in a direction in which the illuminator and the object face each other; and
    the hardware processor uses, in evaluating the image clarity, a range extending from a position at which differential values of the parameters at first become positive values to a position at which the differential values become the maximum values in the evaluation range with decreasing distance from the object.

11. The evaluation device according to claim 10, wherein in the range used in evaluating the image clarity, the position at which the differential values become the maximum values is a position at which the differential values have changed from the positive values to values less than or equal to zero.

12. The evaluation device according to claim 8, wherein the hardware processor extracts a normal distribution curve based on the evaluation range, and uses a standard deviation that is calculated by comparing the normal distribution curve and the evaluation range as the evaluation value.

13. The evaluation device according to claim 12, wherein
    the hardware processor normalizes the parameters in the evaluation range to set a maximum value of the parameters to 1 and set a minimum value of the parameters to 0, and calculates the standard deviation by extracting the normal distribution curve with a position corresponding to the minimum value in the evaluation range being a lower limit value and with a position corresponding to the maximum value being an upper limit value in the evaluation range.

14. The evaluation device according to claim 7, wherein the hardware processor determines whether the image clarity is non-uniform based on a variation amount of the evaluation value in the first direction.

15. The evaluation device according to claim 14, wherein the hardware processor determines whether the image clarity is non-uniform based on the variation amounts of the evaluation values in the first direction for each of positions in the second direction.

16. The evaluation device according to claim 14, wherein
    the hardware processor determines that the print image is non-uniform when a difference between a first average value and a second average value of the evaluation values is greater than or equal to a predetermined value;
    the first average value is larger than an overall average value of the evaluation values for the positions in the first direction; and
    the second average value is smaller than the overall average value.

17. The evaluation device according to claim 14, wherein
    the hardware processor determines that the print image is non-uniform when a difference between an overall average value of the evaluation values for the positions in the first direction and at least one of a first average value and a second average value of the evaluation values is greater than or equal to a predetermined value;
    the first average value is larger than the overall average value; and
    the second average value is smaller than the overall average value.

18. An evaluation method that evaluates an image clarity of a print image in an evaluation device that comprises an object that is projected onto a measurement surface of a recording medium, and an illuminator that makes the object projected onto the measurement surface, the evaluation method comprising:
    imaging the measurement surface on which the object has been projected to obtain image data, wherein the object contacts the recording medium and rotates as the recording medium moves; and
    based on a distribution of parameters related to a brightness of the image data, quantifying a degree of the image clarity into a numerical value and defining the numerical value as an evaluation value of the image clarity.

\* \* \* \* \*